US012525895B2

(12) United States Patent
Kajiyama et al.

(10) Patent No.: US 12,525,895 B2
(45) Date of Patent: Jan. 13, 2026

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Kazuyori Tahata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 248 days.

(21) Appl. No.: 18/254,683

(22) PCT Filed: Dec. 9, 2020

(86) PCT No.: PCT/JP2020/045901
§ 371 (c)(1),
(2) Date: May 26, 2023

(87) PCT Pub. No.: WO2022/123698
PCT Pub. Date: Jun. 16, 2022

(65) Prior Publication Data
US 2024/0305188 A1    Sep. 12, 2024

(51) Int. Cl.
*H02M 7/483*    (2007.01)
*H02M 1/32*     (2007.01)
(Continued)

(52) U.S. Cl.
CPC ......... *H02M 7/4835* (2021.05); *H02M 1/322* (2021.05); *H02M 1/36* (2013.01); *H02M 1/08* (2013.01)

(58) Field of Classification Search
CPC .......... H02M 1/08; H02M 1/322; H02M 1/36; H02M 7/4835
See application file for complete search history.

(56) References Cited

U.S. PATENT DOCUMENTS

2015/0236611 A1    8/2015   Nakazawa et al.
2018/0219546 A1*   8/2018   Yang ................... H02M 7/5387

FOREIGN PATENT DOCUMENTS

EP    3331144 A1 *   6/2018   .............. H02M 1/32
JP    2014108000 A    6/2014
JP    2018093637 A    6/2018

OTHER PUBLICATIONS

International Search Report (PCT/ISA/210) with translation and Written Opinion (PCT/ISA/237) mailed on Feb. 9, 2021, by the Japan Patent Office as the International Searching Authority for International Application No. PCT/JP2020/045901. (8 pages).

(Continued)

*Primary Examiner* — Jue Zhang
(74) *Attorney, Agent, or Firm* — .Buchanan Ingersoll & Rooney PC

(57) ABSTRACT

In a power conversion device, each of a plurality of converter cells includes a pair of input/output terminals, a plurality of switching elements, and a power storage element electrically connected to the input/output terminals through the switching elements. A current-limiting resistor is connected to a path of AC output current of the power converter. A bypass switch is connected in parallel with the current-limiting resistor. A short circuit switch short-circuits an AC line between an AC circuit breaker and the current-limiting resistor. In a discharge operation mode, a control device performs power conversion operation by allowing switching of each switching element of each of the converter cells in a state in which the AC circuit breaker and the bypass switch are opened and the short circuit switch is closed.

13 Claims, 20 Drawing Sheets

(51) Int. Cl.
*H02M 1/36* (2007.01)
*H02M 1/08* (2006.01)

(56) References Cited

OTHER PUBLICATIONS

Extended European Search Report dated Dec. 19, 2023, issued in the corresponding European Patent Application No. 20965081.1, 8 pages.

* cited by examiner

FIG.2
(A)
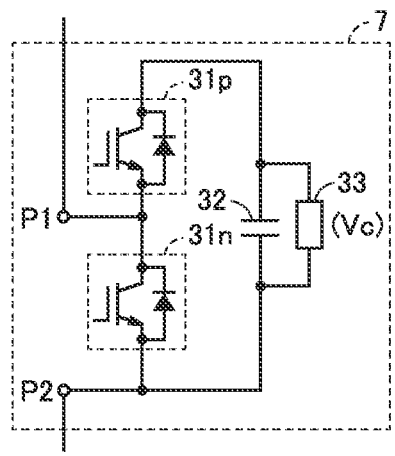
(B)
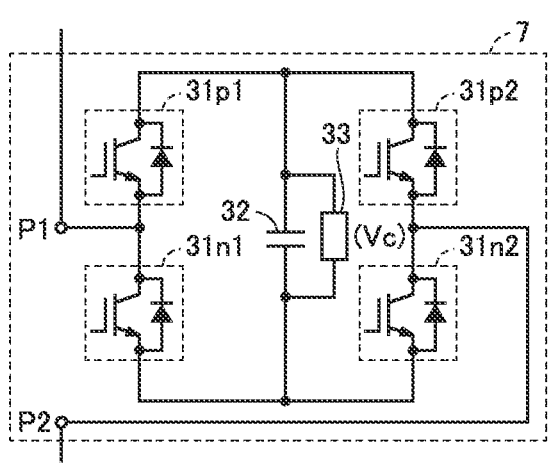

FIG.8
(A) 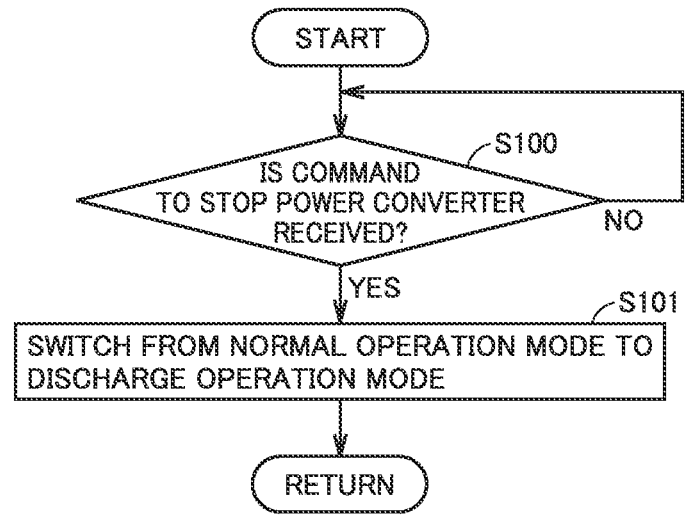
(B) 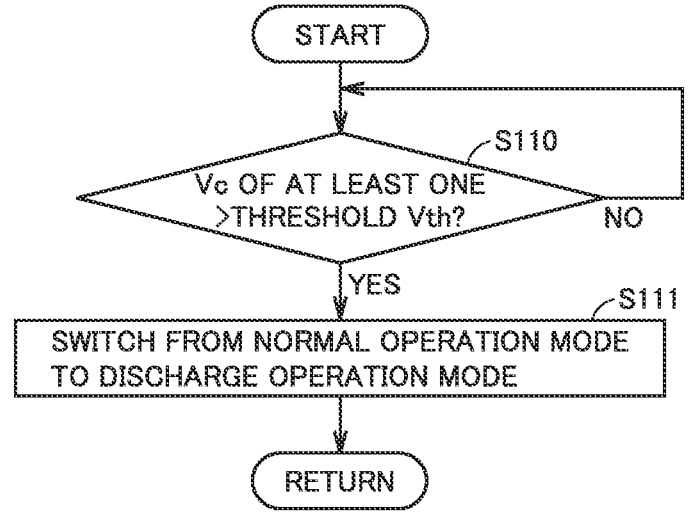
(C) 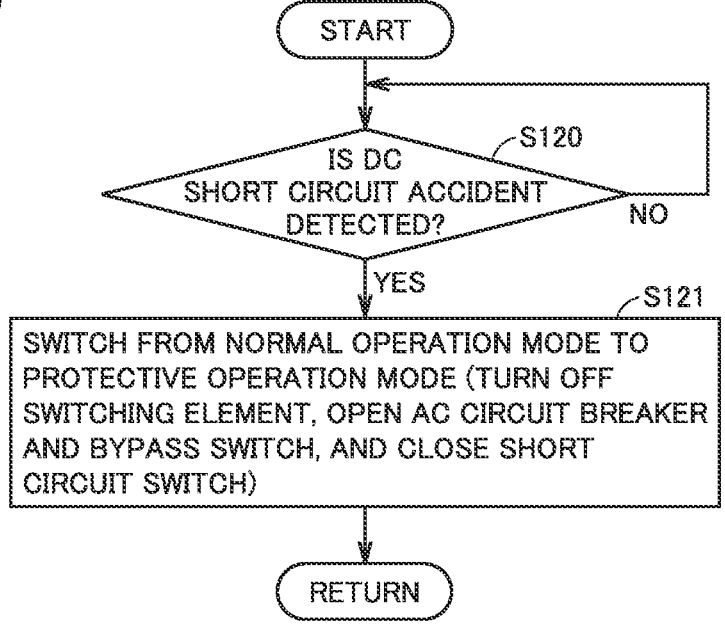

POWER CONVERSION DEVICE

TECHNICAL FIELD

The present disclosure relates to a power conversion device.

BACKGROUND ART

Modular multilevel converters (MMC) are known, which are configured such that a plurality of unit converters (hereinafter also referred to as converter cells) are connected in cascade. MMCs are widely applied to power transmission and distribution systems because they can easily handle high voltage by increasing the number of converter cells connected in cascade. Examples of the application include large-capacity STATCOMs (static synchronous compensators) and AC/DC power conversion devices for high voltage direct current power transmission (HVDC power transmission). STATCOMs are also referred to as static var compensators (SVCs).

Each converter cell that constitutes an MMC includes a plurality of switches (hereinafter also referred to as switching elements) and a power storage element (hereinafter also referred to as a capacitor). There are a variety of configurations of converter cells, such as half bridge circuits (hereinafter also referred to as chopper circuits) and full bridge circuits.

In the MMC, it is requested that a power storage element disposed for each converter cell in a distributed manner is discharged quickly when a charge voltage of the power storage element increases above a prescribed value or when the operation of the MMC is stopped.

For example, Japanese Patent Laying-Open No. 2018-093637 (PTL 1) discloses that a resistor element is provided in parallel with each switching element in the inside of a converter cell. One of a positive electrode-side switching element and a negative electrode-side switching element connected in series is controlled to turn on and the other is controlled to turn off so that discharge energy output from the capacitor is consumed.

CITATION LIST

Patent Literature

PTL 1: Japanese Patent Laying-Open No. 2018-093637

SUMMARY OF INVENTION

Technical Problem

In the MMC described in Japanese Patent Laying-Open No. 2018-093637 (PTL 1) above, a resistor element is physically provided for each converter cell, which may increase the size and the cost of the power conversion device.

The present disclosure is made in view of the background described above, and an object in an aspect is to provide a power conversion device that achieves discharge of the capacitor provided in each converter cell in a short time while minimizing additional physical discharge mechanisms. Other objects and effects of the present disclosure will be described in embodiments with reference to the drawings.

Solution to Problem

A power conversion device in an aspect includes a power converter, an AC circuit breaker, a current-limiting resistor, a bypass switch, a short circuit switch, and a control device. The power converter includes a plurality of arms each having a plurality of converter cells cascaded to each other. Each of the arms is electrically connected to a corresponding phase of an AC circuit. Each of the converter cells includes a pair of input/output terminals, a plurality of switching elements, and a power storage element electrically connected to the input/output terminals through the switching elements. The AC circuit breaker is connected between the AC circuit and the power converter. The current-limiting resistor is connected to a path of AC output current of the power converter. The bypass switch is connected in parallel with the current-limiting resistor. The short circuit switch short-circuits an AC line between the AC circuit breaker and the current-limiting resistor. In a first operation mode, the control device performs power conversion operation by allowing switching of each switching element of each of the converter cells in a state in which the AC circuit breaker and the bypass switch are closed and the short circuit switch is opened. In a second operation mode, the control device performs power conversion operation by allowing switching of each switching element of each of the converter cells in a state in which the AC circuit breaker and the bypass switch are opened and the short circuit switch is closed.

Advantageous Effects of Invention

In the power conversion device in one aspect, only the current-limiting resistor, the bypass switch, and the short circuit switch are provided as physical discharge mechanisms, and discharge of the capacitor provided in each converter cell can be achieved in a short time through the operation in the second operation mode.

BRIEF DESCRIPTION OF DRAWINGS

FIG. 2 is a circuit diagram showing a configuration example of a converter cell that constitutes a power converter.

FIG. 8 is a flowchart illustrating a switching timing from a normal operation mode to a discharge operation mode or a protective operation mode.

DESCRIPTION OF EMBODIMENTS

Figure 1:
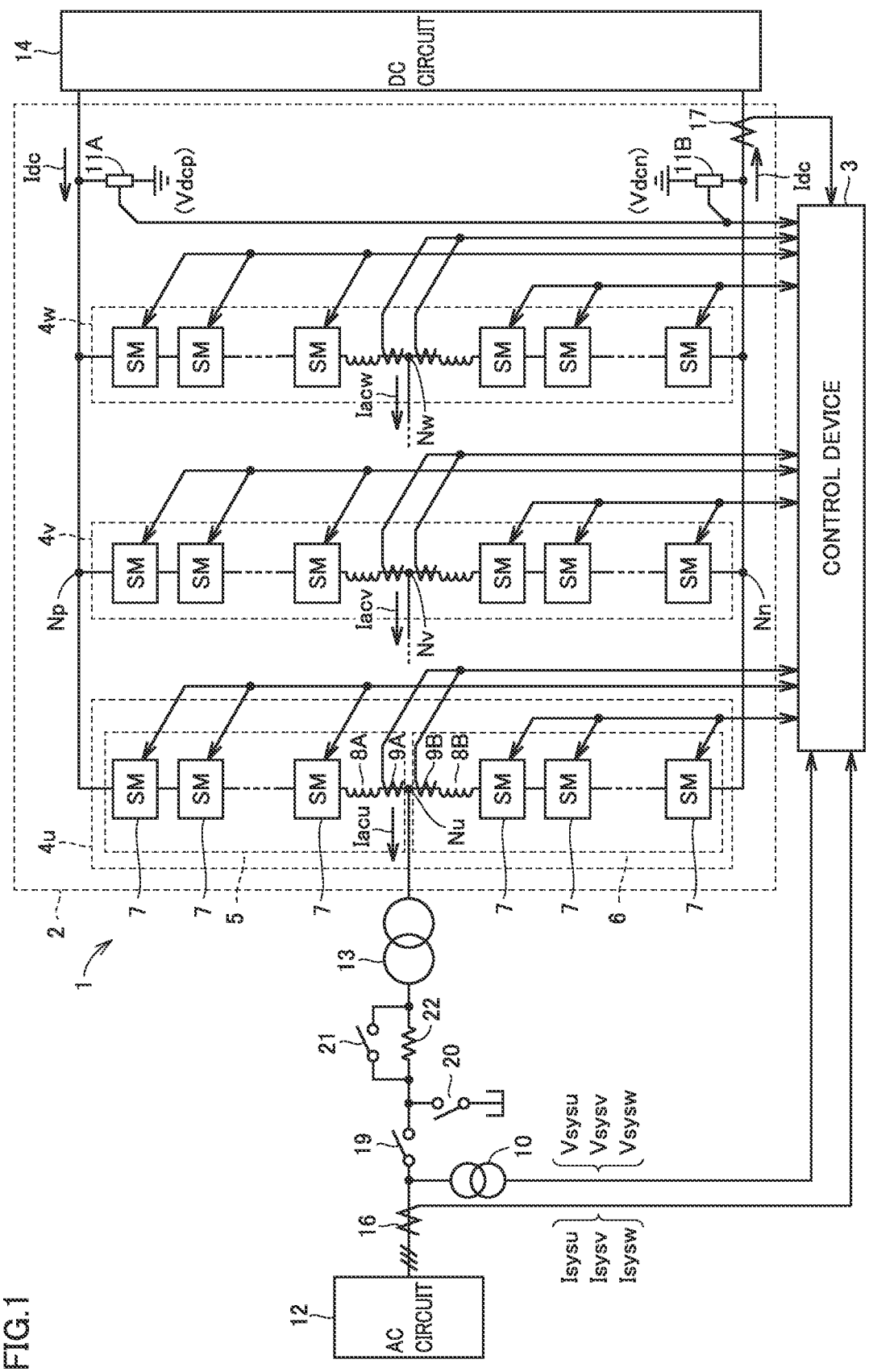
FIG. 1 is a schematic configuration diagram of a power conversion device in a first embodiment.

Embodiments will be described in detail below with reference to the drawings. Like or corresponding parts are denoted by like reference numerals and a description thereof will not always be repeated.

First Embodiment

[Overall Configuration of Power Conversion Device]

FIG. 1 is a schematic configuration diagram of a power conversion device in a first embodiment. Referring to FIG. 1, a power conversion device 1 is configured with a modular multilevel converter (MMC) including a plurality of converter cells connected to each other in series. "Converter cell" may be referred to as "submodule", "SM", or "unit converter". Power conversion device 1 performs power conversion between a DC circuit 14 and an AC circuit 12. Power conversion device 1 includes a power converter 2, a control device 3, a transformer 13, an AC circuit breaker 19, a current-limiting resistor 22, a bypass switch 21, and a short circuit switch 20.

Power converter 2 includes a plurality of leg circuits 4u, 4v, and 4w (denoted as leg circuit 4 when they are collectively referred to or any one of them is referred to) connected in parallel to each other between a positive-electrode DC terminal (that is, high potential-side DC terminal) Np and a negative-electrode DC terminal (that is, low potential-side DC terminal) Nn.

Leg circuit 4 is provided for each of a plurality of phases that constitute alternating current. Leg circuit 4 is connected between AC circuit 12 and DC circuit 14 to perform power conversion between those circuits. In FIG. 1, AC circuit 12 is a three-phase AC system and three leg circuits 4u, 4v, and 4w are provided respectively corresponding to U phase, V phase, and W phase.

AC input terminals Nu, Nv, and Nw provided for leg circuits 4u, 4v, and 4w, respectively, are connected to AC circuit 12 through a transformer 13. An AC circuit breaker 19 is provided between transformer 13 and AC circuit 12. AC circuit 12 is, for example, an AC power system including an AC power source. In FIG. 1, for simplification of illustration, the connection between AC input terminals Ny and Nw and transformer 13 is not shown. Three phase AC lines are depicted as one transmission line.

Current-limiting resistor 22 is connected to a path of AC output current of power converter 2. In FIG. 1, current-limiting resistor 22 is connected between AC circuit breaker 19 and power converter 2. Current-limiting resistor 22 is provided for each of three phase AC lines. In the MMC-type power converter 2, it is common to provide current-limiting resistor 22 in a path of AC output current of power converter 2 in order to suppress discharge current at startup. In power converter 2 in the present disclosure, discharge current is consumed by current-limiting resistor 22 at the time of discharge of power storage element 32 provided in each converter cell 7, thereby accelerating discharge.

Current-limiting resistor 22 may be provided at either the primary side (that is, the AC circuit 12 side) or the secondary side (that is, the power converter 2 side) of transformer 13. When current-limiting resistor 22 is provided at the primary side of transformer 13, inrush current flowing from AC circuit 12 to transformer 13 can be suppressed.

Bypass switch 21 is connected in parallel with the corresponding current-limiting resistor 22. Control device 3 closes bypass switch 21 in a normal operation mode (also referred to as first operation mode) of power converter 2. Then, AC current does not flow through current-limiting resistor 22. Control device 3 opens bypass switch 21 in a discharge operation mode (also referred to as second operation mode) to feed AC current to current-limiting resistor 22. Further, control device 3 opens bypass switch 21 in a protective operation mode (also referred to as third operation mode).

Short circuit switch 20 is connected to the three phase AC line between AC circuit breaker 19 and current-limiting resistor 22. As shown in FIG. 1, short circuit switch 20 may be connected to the three phase AC line by Y connection. In this case, short circuit switch 20 is connected between each of the three phase AC lines and the neutral point. Unlike the case in FIG. 1, three short circuit switches 20 may be connected to the three phase AC lines by delta connection. Alternatively, two short circuit switches 20 may be connected to any two of: between U phase and V phase, between V phase and W phase, and between W phase and U phase.

In the normal operation mode, control device 3 opens each short circuit switch 20. In the discharge operation mode and the protective operation mode, control device 3 closes each short circuit switch 20 to short-circuit the three phase AC lines at the connection point of short circuit switch 20. Thus, three phase resistance loads are interconnected to power converter 2.

Control device 3 sets the power converter 2 to the protective operation mode in a short circuit accident of DC circuit 14. Thus, the three phase AC lines are short-circuited by short circuit switch 20, so that the inflow of fault current into power converter 2 is suppressed, thereby preventing a failure of power converter 2.

Short circuit switch 20 may be provided at either the primary side (that is, the AC circuit 12 side) or the secondary side (that is, the power converter 2 side) of transformer 13. In terms of measures against a short circuit accident of DC circuit 14, it is preferable that short circuit switch 20 is provided at the secondary side of transformer 13. The first reason for this is that short circuit current from AC circuit 12 due to the closing of short circuit switch 20 can be suppressed more. The second reason is that the withstand voltage of short circuit switch 20 can be reduced.

Short circuit switch 20 may be composed of a mechanical switch or a semiconductor element but preferably composed of a semiconductor element capable of faster operation or a hybrid configuration in which a semiconductor element and a mechanical switch are connected in parallel. A semiconductor element allowing large current to flow, such as thyristor, is particularly preferable, because large current flows through short circuit switch 20.

High potential-side DC terminal Np and low potential-side DC terminal Nn connected in common to leg circuits 4 are connected to DC circuit 14. DC circuit 14 is, for example, a DC power system including a DC power grid or a DC terminal of another power conversion device. In the latter case, two power conversion devices are coupled to constitute a back to back (BTB) system for connecting AC power systems with different rated frequencies.

Instead of using transformer 13 in FIG. 1, an interconnecting reactor may be used to connect to AC circuit 12. Furthermore, instead of AC input terminals Nu, Nv, and Nw, leg circuits 4u, 4v, and 4w may be provided with respective primary windings, and leg circuits 4u, 4v, and 4w may be connected in terms of AC to transformer 13 or the interconnecting reactor through secondary windings magnetically coupled to the primary windings. In this case, the primary windings may be reactors 8A and 8B described below. That is, leg circuits 4 are electrically (that is, in terms of DC or AC) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration and hereinafter leg circuit 4u will be described as a representative.

Upper arm 5 includes a plurality of cascaded converter cells 7 and a reactor 8A. A plurality of converter cells 7 and reactor 8A are connected in series. Similarly, lower arm 6 includes a plurality of cascaded converter cells 7 and a reactor 8B. A plurality of converter cells 7 and reactor 8B are connected in series.

In the following description, the number of converter cells 7 included in each of upper arm 5 and lower arm 6 is denoted as Ncell. Here, Ncell≥2. When individual converter cells 7 included in each of upper arm 5 and lower arm 6 are distinguished from each other, they are denoted as converter cells 7_1 to 7_Ncell.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The inductances of the reactors may be different from each other. Only reactor 8A of upper arm 5 or only reactor 8B of lower arm 6 may be provided.

Power conversion device 1 further includes an AC voltage detector 10, an AC current detector 16, DC voltage detectors 11A and 11B, arm current detectors 9A and 9B provided in each leg circuit 4, and a DC current detector 17, as detectors for measuring the quantity of electricity (current, voltage, etc.) used for control. Signals detected by these detectors are input to control device 3.

In FIG. 1, for simplification of illustration, signal lines of signals input from the detectors to control device 3 and signal lines of signals input and output between control device 3 and converter cells 7 are partially collectively illustrated, but they are actually provided for each detector and for each converter cell 7. The signal line between each converter cell 7 and control device 3 may be provided separately for transmission and for reception. The signal line may be formed of, for example, an optical fiber.

Each detector will now be described specifically.

AC voltage detector 10 detects a U phase AC voltage Vsysu, a V phase AC voltage Vsysv, and a W phase AC voltage Vsysw of AC circuit 12. In the following description, Vsysu, Vsysv, and Vsysw may be collectively denoted as Vsys. AC voltages Vacu, Vacv, and Vacw at AC input terminals Nu, Nv, and Nw of power converter 2 can be determined from AC voltages Vsysu, Vsysv, and Vsysw detected by AC voltage detector 10, in consideration of a transformer ratio of transformer 13 and an impedance drop. In the following description, alternating currents Vacu, Vacv, and Vacw may be collectively denoted as Vac.

AC current detector 16 detects U phase AC current Isysu, V phase AC current Isysv, and W phase AC current Isysw of AC circuit 12. In the following description, Isysu, Isysv, and Isysw may be collectively denoted as Isys. AC current is positive when it is output from power converter 2 to AC circuit 12.

DC voltage detector 11A detects a DC voltage Vdcp at high potential-side DC terminal Np connected to DC circuit 14. DC voltage detector 11B detects a DC voltage Vdcn at low potential-side DC terminal Nn connected to DC circuit 14. The difference between DC voltage Vdcp and DC voltage Vdcn is a DC voltage Vdc.

DC current detector 17 detects a DC current Idc flowing through high potential-side DC terminal Np or low potential-side DC terminal Nn. In the following description, DC current is positive when it flows from DC circuit 14 to high potential-side DC terminal Np and when it flows from low potential-side DC terminal Nn to DC circuit 14.

Arm current detectors 9A and 9B provided in leg circuit 4u for U phase respectively detect an upper arm current Ipu flowing through upper arm 5 and a lower arm current Inu flowing through lower arm 6. Arm current detectors 9A and 9B provided in leg circuit 4v for V phase respectively detect an upper arm current Ipv and a lower arm current Inv. Arm current detectors 9A and 9B provided in leg circuit 4w for W phase respectively detect an upper arm current Ipw and a lower arm current Inw. In the following description, upper arm currents Ipu, Ipv, and Ipw may be collectively denoted as upper arm current Iarmp, lower arm currents Inu, Inv, and Inw may be collectively denoted as lower arm current Iarmn, and upper arm current Iarmp and lower arm current Iarmn may be collectively denoted as Iarm. The arm current is positive when it flows from high potential-side DC terminal Np to low potential-side DC terminal Nn.

U phase AC current Iacu, V phase AC current Iacv, and W phase AC current Iacw output from power converter 2 to AC circuit 12 can be represented using arm current Iarm. Specifically, AC current Iac of each phase can be represented as follows.

$$Iacu = Ipu - Inu \qquad (1)$$

$$Iacv = Ipv - Inv \qquad (2)$$

$$Iacw = Ipw - Inw \qquad (3)$$

In the following description, Iacu, Iacv, and Iacw may be collectively denoted as Iac.

AC current Iac represented by the above equations (1) to (3) corresponds to a secondary-side current of the transformer (current on the power converter 2 side). Ideally, AC current Iac and AC current Isys detected by AC current detector 16 are different only by the transformer ratio of transformer 13. When an interconnecting reactor is used instead of transformer 13, AC current Iac and AC current Isys agree. In control device 3, instead of AC current Iac calculated by the above equations (1) to (3), AC current Isys measured by AC current detector 16 may be used.

DC current Idc flowing from DC circuit 14 to high potential-side DC terminal Np of power converter 2 also can be represented using arm current Iarm. Specifically, DC current Idc is represented as follows.

$$Idc = (Ipu + Inu + Ipv + Inv + Ipw + Inw)/2 \quad (4)$$

Current flowing through a closed circuit in power converter 2 without including AC circuit 12 and DC circuit 14 in a path is referred to as circulating current. Circulating current Izu flowing through the U phase arm, circulating current Izv flowing through the V phase arm, and circulating current Izw flowing through W phase arm can be defined as follows.

$$Izu = (Ipu + Inu)/2 - Idc/3 \quad (5)$$
$$Izv = (Ipv + Inv)/2 - Idc/3 \quad (6)$$
$$Izw = (Ipw + Inw)/2 - Idc/3 \quad (7)$$

Phase circulating currents Izu, Izv, and Izw are collectively denoted as Iz.

[Configuration Example of Converter Cell]

FIG. 2 is a circuit diagram showing a configuration example of a converter cell that constitutes a power converter.

Converter cell 7 shown in (A) in FIG. 2 has a circuit configuration called half bridge configuration. This converter cell 7 includes a series of two switching elements $31p$ and $31n$ connected in series, a power storage element 32, a voltage detector 33, and input/output terminals P1 and P2. The series of switching elements $31p$ and $31n$ and power storage element 32 are connected in parallel. Voltage detector 33 detects a voltage Vc between both ends of power storage element 32.

Both terminals of switching element $31n$ are connected to input/output terminals P1 and P2. Converter cell 7 outputs voltage Vc of power storage element 32 or zero voltage to between input/output terminals P1 and P2, through switching operation of switching elements $31p$ and $31n$. When switching element $31p$ turns on and switching element $31n$ turns off, voltage Vc of power storage element 32 is output from converter cell 7. When switching element $31p$ turns off and switching element $31n$ turns on, converter cell 7 outputs zero voltage.

Converter cell 7 shown in (B) in FIG. 2 has a circuit configuration called full bridge configuration. This converter cell 7 includes a first series of two switching elements $31p1$ and $31n1$ connected in series, a second series of two switching elements $31p2$ and $31n2$ connected in series, a power storage element 32, a voltage detector 33, and input/output terminals P1 and P2. The first series, the second series, and power storage element 32 are connected in parallel. Voltage detector 33 detects a voltage Vc between both ends of power storage element 32.

The midpoint between switching element $31p1$ and switching element $31n1$ is connected to input/output terminal P1. Similarly, the midpoint between switching element $31p2$ and switching element $31n2$ is connected to input/output terminal P2. Converter cell 7 outputs voltage Vc and −Vc of power storage element 32 or zero voltage to between input/output terminals P1 and P2, through switching operation of switching elements $31p1$, $31n1$, $31p2$, and $31n2$.

In (A) and (B) in FIG. 2, switching elements $31p$, $31n$, $31p1$, $31n1$, $31p2$, and $31n2$ are configured, for example, such that a freewheeling diode (FWD) is connected in antiparallel with a self turn-off semiconductor switching element such as insulated gate bipolar transistor (IGBT) and gate commutated turn-off (GCT) thyristor.

In (A) and (B) in FIG. 2, a capacitor such as a film capacitor is mainly used for power storage element 32. In the following description, power storage element 32 may be called capacitor. Hereinafter voltage Vc of power storage element 32 may be referred to as capacitor voltage Vc.

As shown in FIG. 1, converter cells 7 are cascaded. In each of (A) and (B) in FIG. 2, in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu. Similarly, in converter cell 7 arranged in lower arm 6, input/output terminal P1 is connected to input/output terminal P2 of adjacent converter cell 7 or AC input terminal Nu, and input/output terminal P2 is connected to input/output terminal P1 of adjacent converter cell 7 or low potential-side DC terminal Nn.

In the following, converter cell 7 has the half bridge cell configuration shown in (A) in FIG. 2, a semiconductor switching element is used as a switching element, and a capacitor is used as a power storage element. However, converter cell 7 that constitutes power converter 2 may have the full bridge configuration shown in (B) in FIG. 2. A converter cell other than the configuration described above by way of example, for example, a converter cell having a circuit configuration called clamped double cell may be used, and the switching element and the power storage element are also not limited to the examples above.

When the half bridge cell configuration shown in (A) in FIG. 2 is employed, power converter 2 may be failed in a short circuit accident of DC circuit 14. The reason for this is that even though the operation of power converter 2 is stopped, interruption operation by AC circuit breaker 19 is too late and excessive fault current from AC circuit 12 flows into power converter 2 through the diode of switching element $31n$ of converter cell 7. In power conversion device 1 in the present embodiment, in a DC short circuit accident, control device 3 performs control such that short circuit switch 20 is closed thereby suppressing an inflow of fault current into power converter 2. As a result, a failure of power converter 2 can be prevented.

[Control Device]

Figure 3:
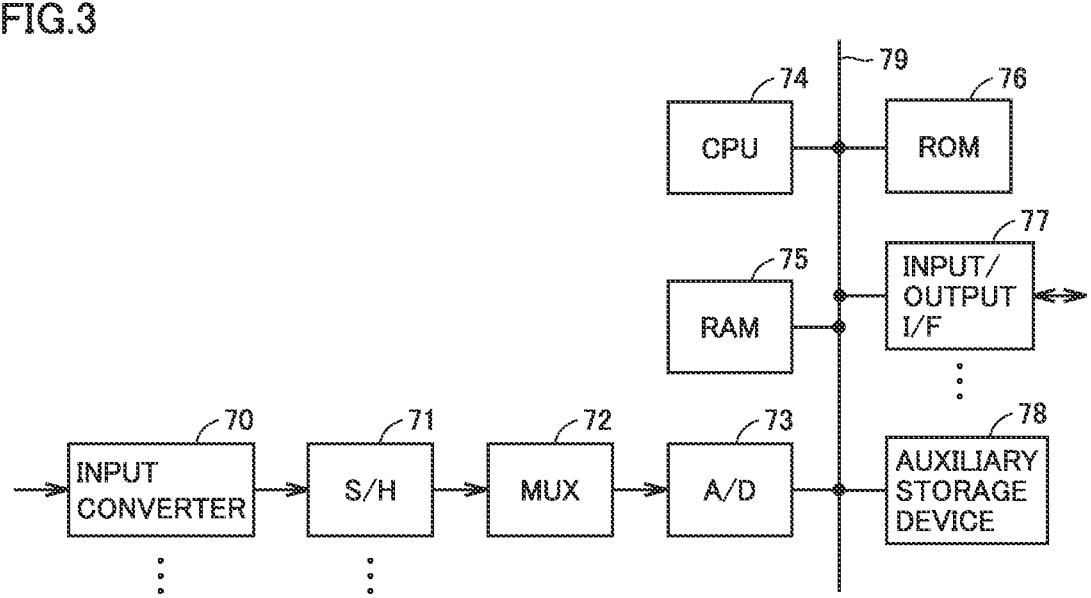
FIG. 3 is a block diagram showing a hardware configuration example of a control device 3.

FIG. 3 is a block diagram showing a hardware configuration example of control device 3. FIG. 3 shows an example in which control device 3 is configured with a computer.

Referring to FIG. 3, control device 3 includes one or more input converters 70, one or more sample and hold (S/H) circuits 71, a multiplexer (MUX) 72, and an analog-to-digital (A/D) converter 73. Control device 3 further includes one or more central processing units (CPU) 74, a random access memory (RAM) 75, and a read only memory (ROM)

76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal at a voltage level suitable for subsequent signal processing.

Sample and hold circuit 71 is provided for each input converter 70. Sample and hold circuit 71 samples a signal representing the electrical quantity received from the corresponding input converter 70 at a predetermined sampling frequency and holds the signal.

Multiplexer 72 successively selects the signals held by a plurality of sample and hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detected values.

Input/output interface 77 is an interface circuit for communication between CPU 74 and an external device.

Unlike the example of FIG. 3, at least a part of control device 3 may be configured using circuitry such as a field programmable gate array (FPGA) and an application specific integrated circuit (ASIC). That is, the function of each functional block shown in FIG. 3 can be configured based on the computer illustrated in FIG. 3 and may be at least partially configured with circuitry such as an FPGA and an ASIC. At least part of the function of each functional block may be configured with an analog circuit.

Figure 4:
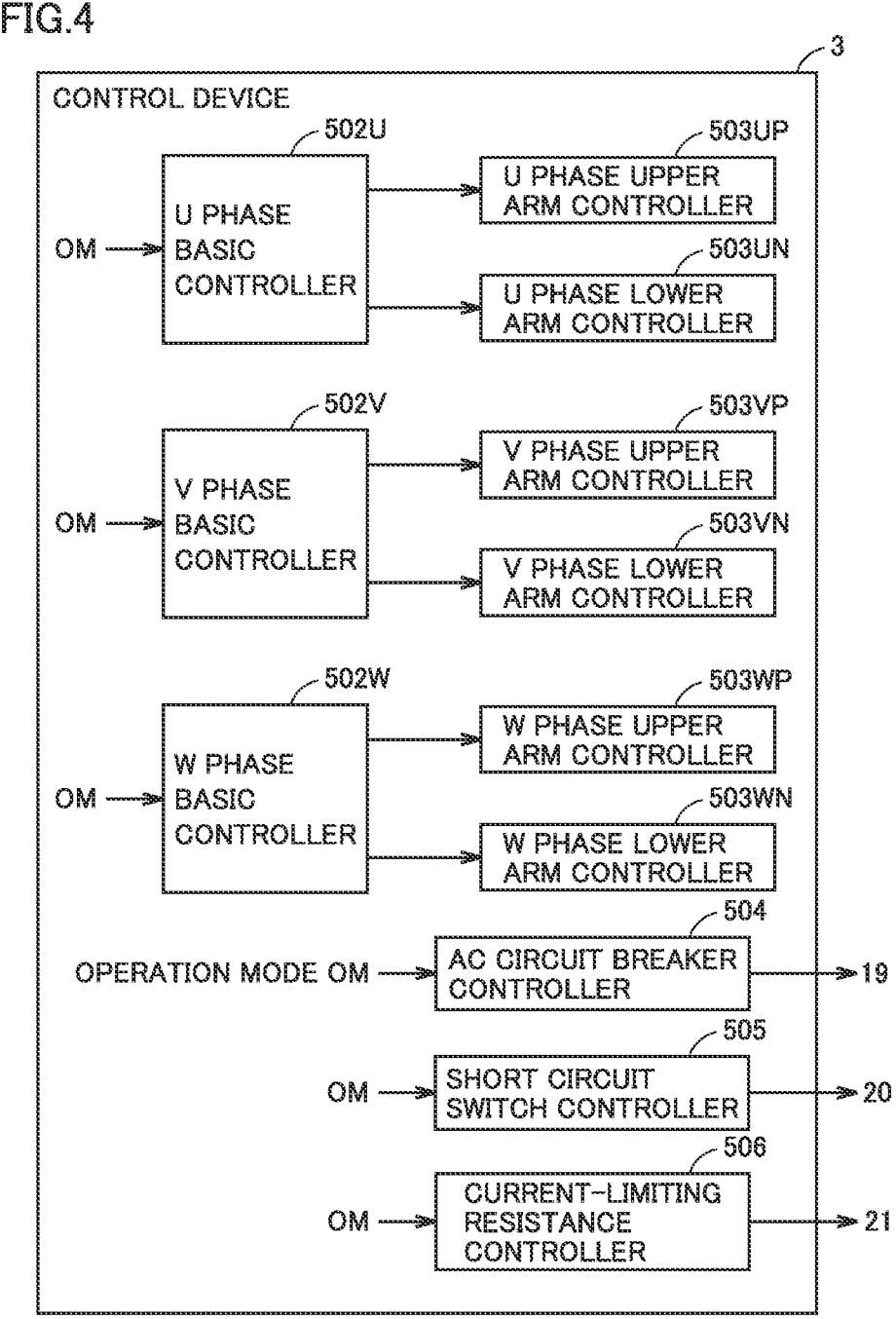
FIG. 4 is a functional block diagram illustrating an internal configuration of the control device shown in FIG. 1.

FIG. 4 is a functional block diagram illustrating an internal configuration of the control device shown in FIG. 1. Control device 3 controls the on and off of switching elements 31p and 31n of each converter cell 7, as one of its control functions. Control device 3 further controls the on and off of AC circuit breaker 19, short circuit switch 20, and bypass switch 21 illustrated in FIG. 1.

Control device 3 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, a W-phase lower arm controller 503WN, an AC circuit breaker controller 504, a short circuit switch controller 505, and a current-limiting resistance controller 506. In the present description, a variety of electrical quantities for use in computation in these controllers that constitute control device 3 are converted into units by the per unit (PU) method.

In the following description, U-phase basic controller 502U, V-phase basic controller 502V, and W-phase basic controller 502W may be denoted as basic controller 502 when they are collectively referred to or that of any one of the phases is referred to. U-phase upper arm controller 503UP, V-phase upper arm controller 503VP, and W-phase upper arm controller 503WP may be denoted as upper arm controller 503P when they are collectively referred to or that of any one of the phases is referred to. U-phase lower arm controller 503UN, V-phase lower arm controller 503VN, and W-phase lower arm controller 503WN may be denoted as lower arm controller 503N when they are collectively referred to or that of any one of the phases is referred to. Upper arm controller 503P and lower arm controller 503N are collectively denoted as arm controller 503.

A configuration example of basic controller 502 will be described with reference to FIG. 5 and FIG. 6, and a configuration example of arm controller 503 will be described with reference to FIG. 7. The other configuration in FIG. 4 will be described below.

AC circuit breaker controller 504 controls the on/off of AC circuit breaker 19 in FIG. 1. In an aspect, AC circuit breaker controller 504 closes AC circuit breaker 19 when operation mode OM of power converter 2 is the normal operation mode, and opens AC circuit breaker 19 when operation mode OM is the discharge operation mode and the protective operation mode.

Short circuit switch controller 505 controls the on/off of short circuit switch 20 in FIG. 1. In an aspect, short circuit switch controller 505 opens short circuit switch 20 when operation mode OM of power converter 2 is the normal operation mode, and closes short circuit switch 20 when operation mode OM is the discharge operation mode and the protective operation mode.

Current-limiting resistance controller 506 controls the on/off of bypass switch 21 in FIG. 1. In an aspect, current-limiting resistance controller 506 closes bypass switch 21 when operation mode OM of power converter 2 is the normal operation mode, and opens bypass switch 21 when operation mode OM is the discharge operation mode and the protective operation mode.

Figure 5:
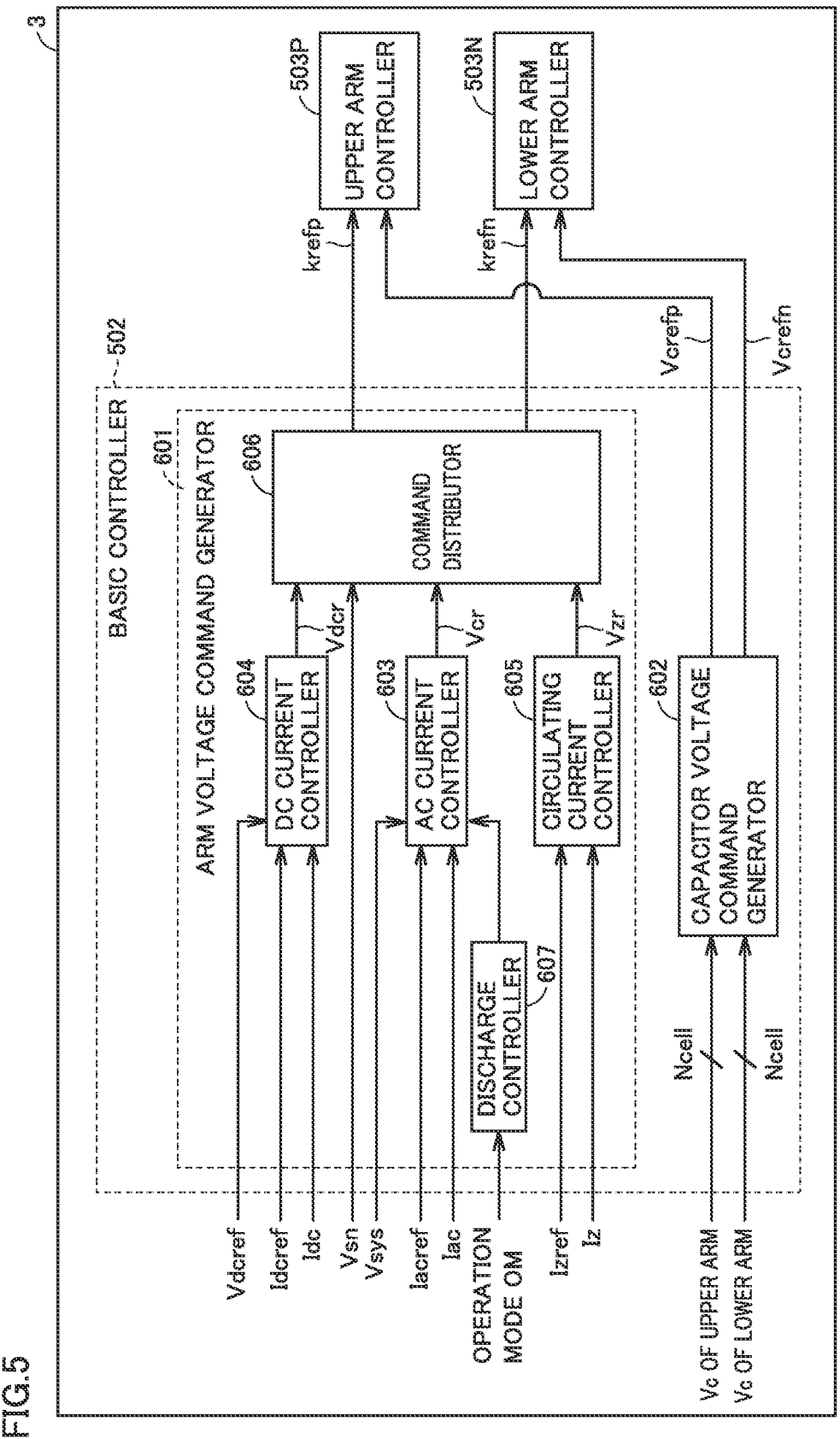
FIG. 5 is a diagram showing a configuration of each basic controller 502 in FIG. 4 in more detail.

FIG. 5 is a diagram showing a configuration of each basic controller 502 in FIG. 4 in more detail. Referring to FIG. 5, basic controller 502 includes an arm voltage command generator 601 and a capacitor voltage command generator 602.

Arm voltage command generator 601 generates a voltage command value krefp of Ncell converter cells 7 included in upper arm 5 in FIG. 1 and a voltage command value krefn of Ncell converter cells 7 included in lower arm 6. Arm voltage command generator 601 outputs the generated voltage command value krefp to upper arm controller 503P and outputs the generated voltage command value krefn to lower arm controller 503N. In the following description, voltage command value krefp for upper arm 5 and voltage command value krefn for lower arm 6 are collectively denoted as voltage command value kref.

Capacitor voltage command generator 602 generates a capacitor voltage command value Vcrefp of capacitors 32 of Ncell converter cells 7 included in upper arm 5. Capacitor voltage command generator 602 further generates a capacitor voltage command value Vcrefn of capacitors 32 of Ncell converter cells 7 included in lower arm 6. Capacitor voltage command generator 602 outputs the generated capacitor voltage command value Vcrefp for upper arm 5 to upper arm controller 503P and outputs the generated capacitor voltage command value Vcrefn for lower arm 6 to lower arm controller 503N.

Capacitor voltage command value Vcrefp for upper arm 5 is, for example, the average voltage of capacitors 32 of converter cells 7 in the upper arm, and capacitor voltage command value Vcrefn for lower arm 6 is, for example, the average voltage of capacitors 32 of converter cells 7 in lower arm 6. In the following description, capacitor voltage command value Vcrefp for upper arm 5 and capacitor voltage command value Vcrefn for lower arm 6 are collectively denoted as capacitor voltage command value Vcref.

As shown in FIG. 5, more specifically, arm voltage command value generator 601 includes an AC current controller 603, a DC current controller 604, a circulating current controller 605, a command distributor 606, and a discharge controller 607.

AC current controller 603 generates an AC control command value Vor by feedback control for nullifying a deviation between the detected AC current Iac and the set AC current command value Iacref and feed forward control of AC voltage Vsys of AC circuit 12. In the discharge operation mode, AC current controller 603 performs feedback control based on a detection value of AC current Iac, in a state in which AC voltage Vsys of AC circuit 12 is assumed as 0, based on a command from discharge controller 607. Thus, control device 3 can perform discharge of capacitor 32 of each converter cell 7 stably without the need for special control.

Figure 6:
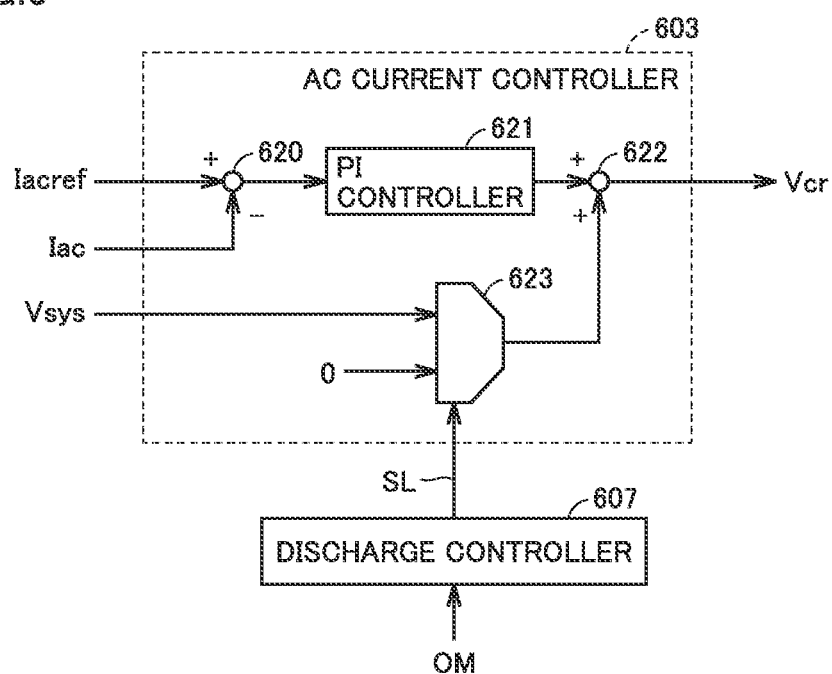
FIG. 6 is a block diagram showing a configuration example of AC current controller 603 in FIG. 5 in more detail.

FIG. 6 is a block diagram showing a configuration example of AC current controller 603 in FIG. 5 in more detail. In FIG. 6, discharge controller 607 in FIG. 5 is also shown.

Referring to FIG. 6, AC current controller 603 includes a subtractor 620, a proportional integral (PI) controller 621, an adder 622, and a selector 623. Unlike the case in FIG. 5 and FIG. 6, the configuration of AC current controller 603 may include discharge controller 607.

Subtractor 620 subtracts a detection value of AC current Iac from AC current command value Iacref. P1 controller 621 performs proportional computation and integral computation for the deviation between AC current command value Iacref and AC current Iac calculated by subtractor 620. Instead of P1 controller 621, PID control that further performs derivative computation may be used or a controller having another configuration used in feedback computation may be used.

Selector 623 outputs a detection value of AC voltage Vsys or 0 to adder 622 in accordance with a select signal SL applied from discharge controller 607. Specifically, discharge controller 607 sets select signal SL such that a detection value of AC voltage Vsys is output from selector 623 to adder 622 when operation mode OM of power converter 2 is the normal operation mode. Discharge controller 607 sets select signal SL such that 0 is output from selector 623 to adder 622 when operation mode OM of power converter 2 is the discharge operation mode.

Adder 622 generates AC control command value Ver by adding the output of PI controller 621 to the output of selector 623.

Referring to FIG. 5 again, DC current controller 604 calculates a DC control command value Vdcr for nullifying a deviation between the detected DC current Idc and the set DC current command value Idcref, based on the set DC voltage command value Vdcref and the set DC current command value Idcref. In doing so, DC voltage command value Vdcref may be computed based on the detected DC voltage Vdc. In the discharge operation mode in the first embodiment, DC current command value Idcref may be set to, for example, 0).

Circulating current controller 605 calculates a circulating control command value Vzr for controlling the detected circulating current Iz to follow the set circulating current command value Izref. In one aspect, circulating current command value Izref is set, for example, to 0. In another aspect, circulating current command value Izref is set such that the difference in average value of capacitor voltages of leg circuits 4u, 4v, and 4w is reduced and that the difference in average value of capacitor voltages of upper arm 5 and lower arm 6 is reduced for each phase.

Command distributor 606 receives AC control command value Vcr, circulating control command value Vzr, DC control command value Vdcr, and neutral point voltage Vsn. Since the AC side of power converter 2 is connected to AC circuit 12 through transformer 13, neutral point voltage Vsn can be determined from the voltage of the DC power source of DC circuit 14. DC control command value Vdcr may be determined by DC output control or may be a fixed value.

Command distributor 606 calculates a voltage output and shared by each of the upper arm and the lower arm, based on these inputs. Command distributor 606 determines arm voltage command value krefp of the upper arm and arm voltage command value krefn of the lower arm by subtracting a voltage drop due to an inductance component in the upper arm and the lower arm from the calculated voltage.

The determined arm voltage command value krefp of the upper arm and arm voltage command value krefn of the lower arm are output voltage commands for allowing AC current Iac to follow AC current command value Iacref, allowing circulating current Iz to follow circulating current command value Izref, allowing DC voltage Vdc to follow DC voltage command value Vdcref, and performing feedforward control of AC voltage Vsys.

Figure 7:
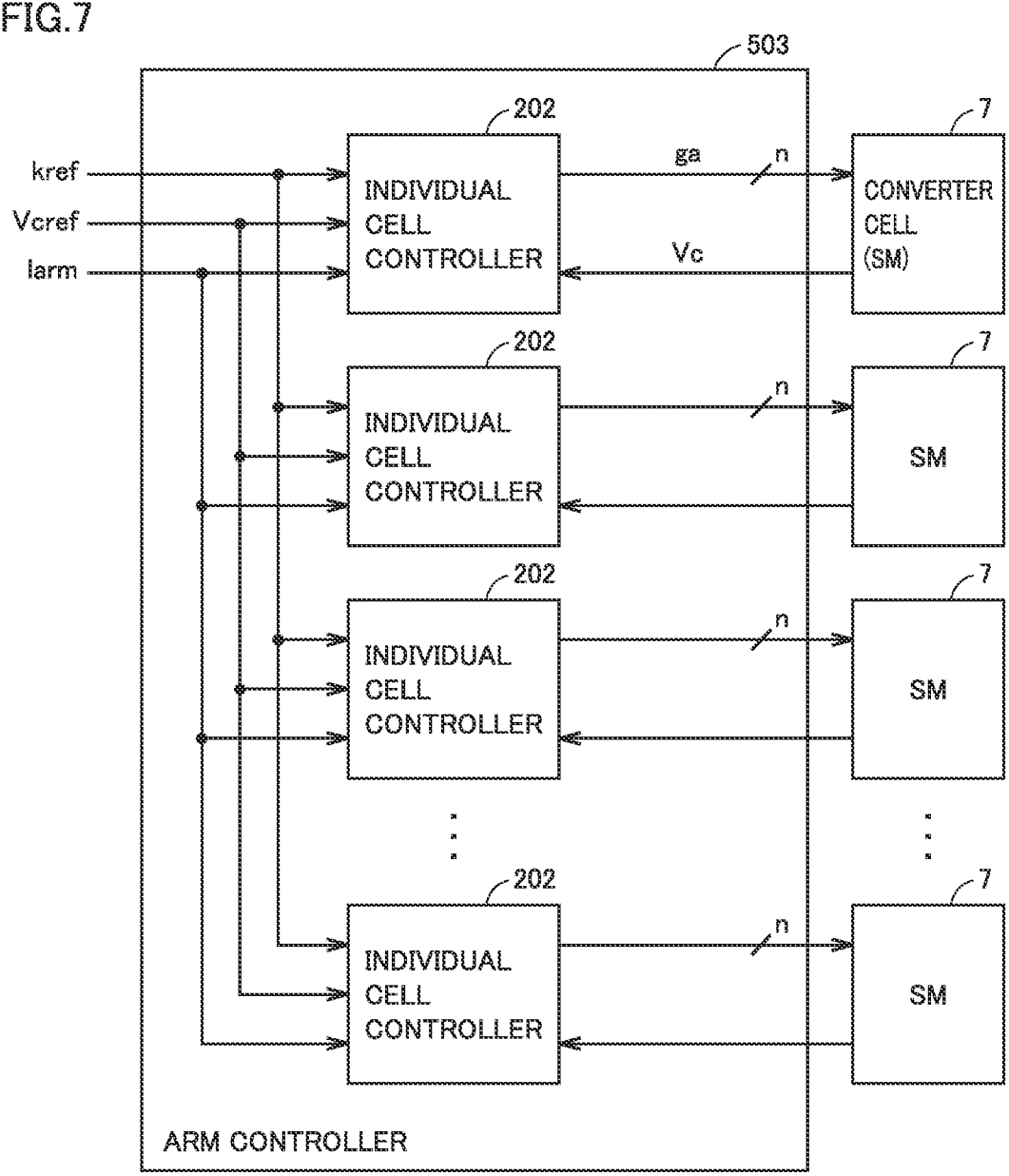
FIG. 7 is a block diagram illustrating a configuration example of arm controller 503.

FIG. 7 is a block diagram illustrating a configuration example of arm controller 503. Referring to FIG. 7, arm controller 503 includes Ncell individual cell controllers 202.

Each individual cell controller 202 individually controls the corresponding converter cell 7. Individual cell controller 202 receives arm voltage command value kref, arm current Iarm, and capacitor voltage command value Vcref from basic controller 502.

Individual cell controller 202 generates a gate signal ga of the corresponding converter cell 7 and outputs the generated gate signal ga to the corresponding converter cell 7. In converter cell 7 in (A) in FIG. 2, gate signal ga is a signal for controlling the on and off of switching elements 31p and 31n (n=2). When converter cell 7 is the full bridge configuration in (B) in FIG. 2, respective gate signals for switching elements 31p1, 31n1, 31p2, and 31n2 are generated (n=4).

On the other hand, each individual cell controller 202 receives a detection value of capacitor voltage Vc from voltage detector 33 of the corresponding converter cell 7. Further, the detection value of capacitor voltage Vc from voltage detector 33 of each converter cell 7 is input to basic controller 502.

[Control Procedure of Power Converter in Discharge Operation Mode and Protective Operation Mode]

The foregoing description of the control procedure of power converter 2 in the discharge operation mode and the protective operation mode will be summarized below.

FIG. 8 is a flowchart illustrating a switching timing from the normal operation mode to the discharge operation mode or a protective operation mode. In an initial state, it is assumed that control device 3 is operating in the normal operation mode.

Referring to the flowchart (A) in FIG. 8, when a command to stop power converter 2 is received (YES at step S100), control device 3 proceeds to step S101. At step S101, control device 3 switches the operation mode from the normal operation mode to the discharge operation mode.

Referring to the flowchart (B) in FIG. 8, when at least one capacitor voltage Vc exceeds a threshold Vth (YES at step S110), control device 3 proceeds to step S111. At step S111, control device 3 switches the operation mode from the normal operation mode to the discharge operation mode.

Referring to the flowchart (C) in FIG. 8, if a short circuit accident is detected in DC circuit 14 (YES at step S120), control device 3 proceeds to step S121. At step S121, control device 3 switches the operation mode from the normal operation mode to the protective operation mode. For example, when DC current Idc detected by DC current detector 17 exceeds a threshold, control device 3 determines that a short circuit accident has occurred in DC circuit 14.

In the protective operation mode, control device 3 turns off all of the switching elements that constitute power converter 2. Thus, power converter 2 does not perform the power conversion operation. In addition, control device 3 opens AC circuit breaker 19 and bypass switch 21 and closes short circuit switch 20, in the same manner as in the discharge operation mode.

Figure 9:
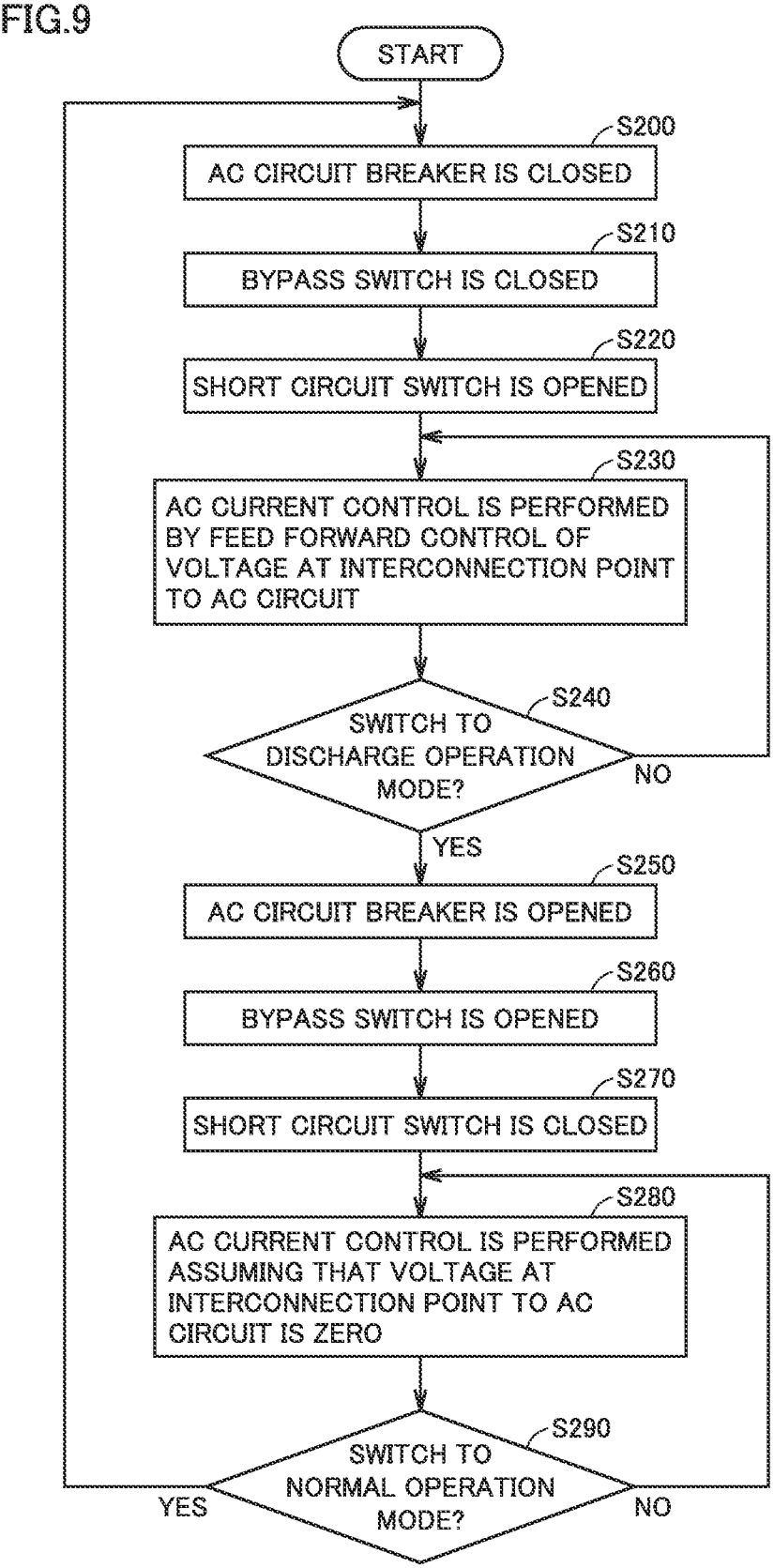
FIG. 9 is a flowchart illustrating the operation of an AC circuit breaker controller, a short circuit switch controller, and a current-limiting resistance controller in FIG. 4 and the basic controller in FIG. 5 in the discharge operation mode.

FIG. 9 is a flowchart illustrating the operation of the AC circuit breaker controller, the short circuit switch controller, and the current-limiting resistance controller in FIG. 4 and the basic controller in FIG. 5 in the discharge operation mode.

Referring to FIG. 9, in the normal operation mode, AC circuit breaker 19 is closed (S200), bypass switch 21 is closed (S210), and short circuit switch 20 is open (S220). In this state, control device 3 performs the power conversion operation by allowing switching of the switching elements of each converter cell 7. For example, AC current controller 603 performs feedback control for nullifying a deviation between AC output current Iac of power converter 2 and AC current command value Iacref and feed forward control of AC voltage Vsy's at the interconnection point to AC circuit 12 (S230).

When the operation mode is switched from the normal operation mode to the discharge operation mode (YES at step S240), AC circuit breaker controller 504 opens AC circuit breaker 19 (step S250), current-limiting resistance controller 506 opens bypass switch 21 (step S260), and short circuit switch controller 505 closes short circuit switch 20 (step S270). Steps S250 to step S270 may be performed in any order or may be performed in parallel. Considering the influence on AC circuit 12, it is preferable that the opening operation of AC circuit breaker 19 is performed prior to the closing operation of short circuit switch 20.

In the discharge operation mode, control device 3 also performs the power conversion operation by allowing switching of the switching elements of each converter cell 7. Here, AC current controller 603 performs feedback control for nullifying a deviation between AC current Iac and AC current command value Iacref, assuming that AC voltage Vsys at the interconnection point to AC circuit 12 is 0 (step S280). While the discharge operation mode is continued (NO at step S290), AC current controller 603 performs the AC current control described above.

When the operation mode is switched from the discharge operation mode to the normal operation mode (YES at step S290), AC circuit breaker controller 504 closes AC circuit breaker 19 (step S200), current-limiting resistance controller 506 closes bypass switch 21 (step S210), and short circuit switch controller 505 opens short circuit switch 20 (step S220). Steps S200 to step S220 may be performed in any order or may be performed in parallel. Considering the influence on AC circuit 12, it is preferable that the opening operation of short circuit switch 20 is performed prior to the closing operation of AC circuit breaker 19.

In the normal operation mode, control device 3 performs the power conversion operation by allowing switching of the switching elements of each converter cell 7 as described above. For example, AC current controller 603 performs feedback control for nullifying a deviation between AC output current Iac and AC current command value Iacref and feed forward control of AC voltage Vsys at the interconnection point to AC circuit 12 (step S230). While the normal operation mode is continued (NO at step S240), AC current controller 603 performs the AC current control described above.

Effect of First Embodiment

As described above, in power conversion device 1 in the first embodiment, when capacitor 32 is discharged, short circuit switch 20 provided on the three phase AC line is closed and bypass switch 21 is opened in a state in which AC circuit breaker 19 is closed, so that AC current Iac flows through current-limiting resistor 22. As a result, capacitor 32 can be discharged fast without performing special control by basic controller 502.

Furthermore, in power conversion device 1 in the first embodiment, the operation mode is switched to the protective operation mode in a DC short circuit accident, whereby the short circuit switch provided on the three phase AC line is closed. As a result, fault current can be suppressed.

Second Embodiment

Power converter 2 in a second embodiment differs from power converter 2 in the first embodiment in that the current-limiting resistor and the bypass switch are provided in each arm instead of the three phase AC line. A detailed description will be given below with reference to FIG. 10 and FIG. 11.

[Overall Configuration of Power Conversion Device]

Figure 10:
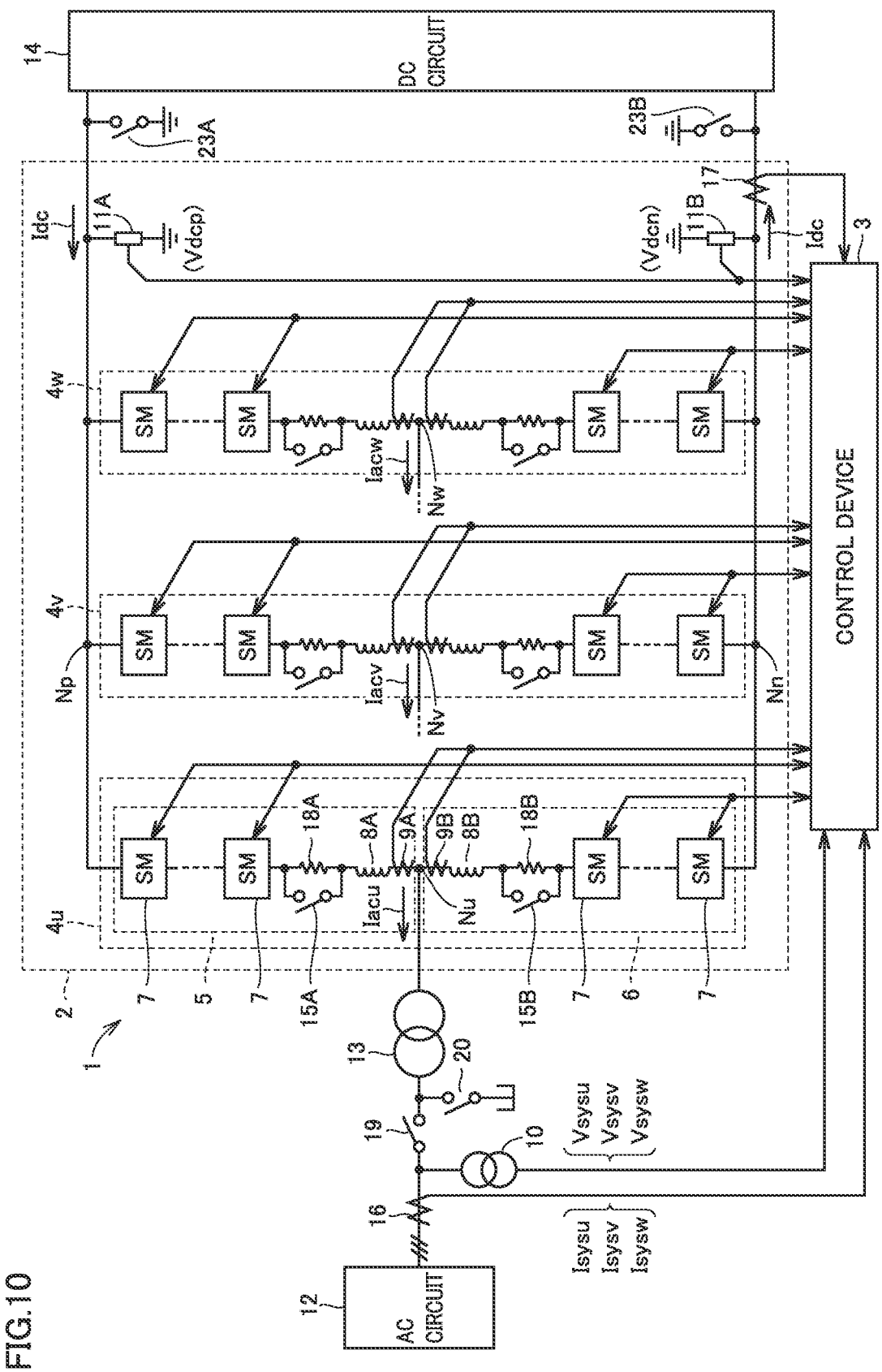
FIG. 10 is a schematic configuration diagram of a power conversion device in a second embodiment.

FIG. 10 is a schematic configuration diagram of a power conversion device in the second embodiment. In power converter 2 in FIG. 10, instead of bypass switch 21 and current-limiting resistor 22 provided on the three phase AC line, current-limiting resistors 18A and 18B are provided in upper arm 5 and lower arm 6 in each leg circuit 4, and bypass switches 15A and 15B are connected in parallel with current-limiting resistors 18A and 18B, respectively.

In each converter cell 7, current-limiting resistor 18A is connected in series with each converter cell 7 and reactor 8A in upper arm 5. Current-limiting resistor 18A may be provided in any position in upper arm 5. Current-limiting resistor 18B is connected in series with each converter cell 7 and reactor 8B in lower arm 6. Current-limiting resistor 18B may be provided in any position in lower arm 6. Hereinafter, current-limiting resistors 18A and 18B are denoted as current-limiting resistor 18 when they are collectively referred to or any one of them is referred to. Bypass switches 15A and 15B are denoted as bypass switch 15 when they are collectively referred to or any one of them is referred to.

In power converter 2 in FIG. 10, a short circuit switch 23A for short-circuiting high potential-side DC terminal Np to the ground electrode and a short circuit switch 23B for short-circuiting low potential-side DC terminal Nn to the ground electrode are further connected to the DC line. In the discharge operation mode, bypass switches 15A and 15B are opened and short circuit switches 20, 23A, and 23B are closed, whereby both of AC short circuit current and DC short circuit current can be fed through current-limiting resistor 18A provided in each upper arm 5 and current-limiting resistor 18B provided in each lower arm 6, thereby accelerating discharge of capacitor 32 of each converter cell 7. In the discharge operation mode in the second embodiment, it is preferable to set the DC current command value to a value different from 0, because it is necessary to feed DC short circuit current. Alternatively, DC control command value Vdcr may be controlled such that a fixed DC voltage or a DC voltage proportional to a capacitor voltage is output.

The other parts in FIG. 10 are the same as those in FIG. 1 and the same or corresponding parts are denoted by the same reference signs and will not be further elaborated.

[Configuration of Control Device]

Figure 11:
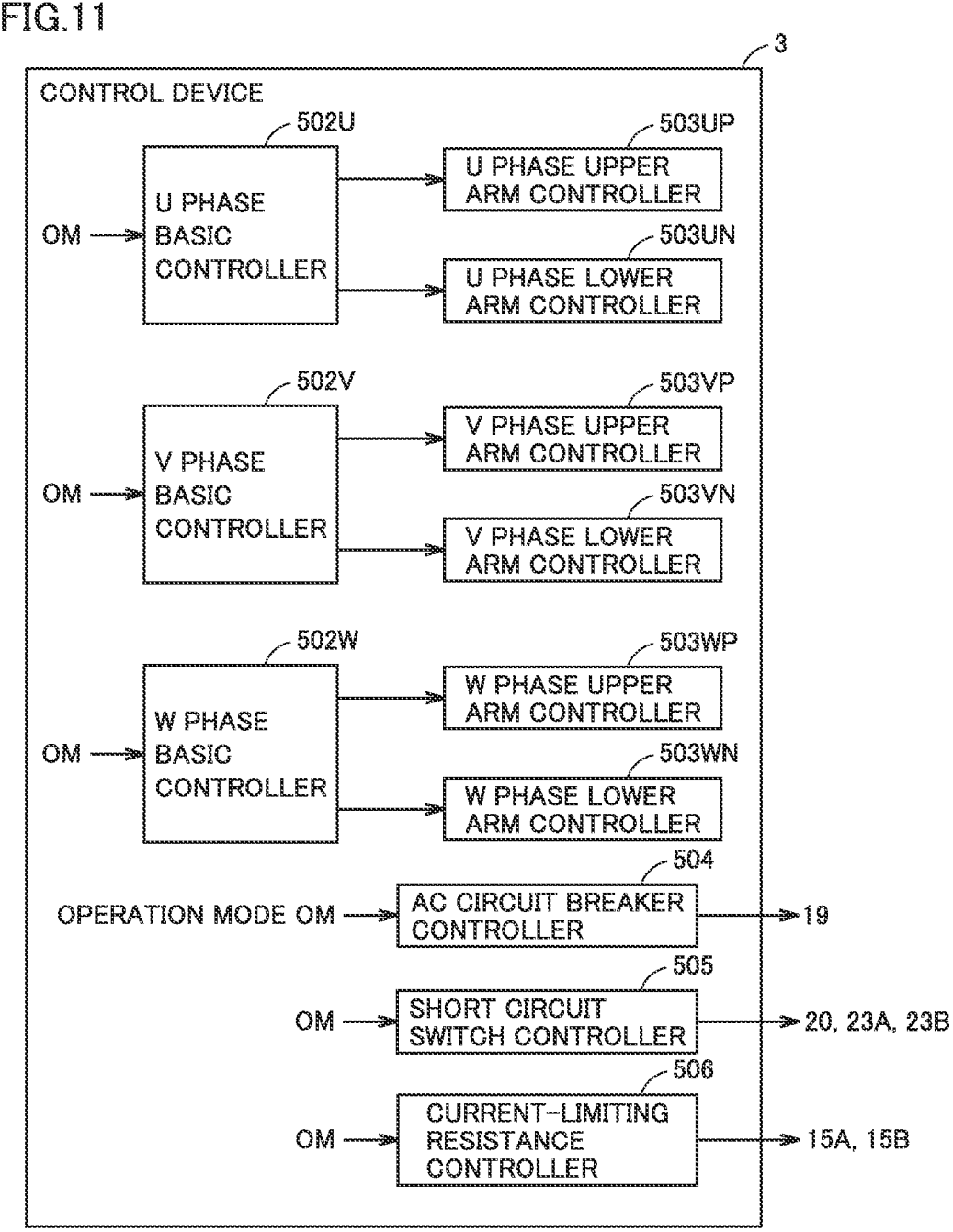
FIG. 11 is a functional block diagram illustrating an internal configuration of the control device shown in FIG. 10.

FIG. 11 is a functional block diagram illustrating an internal configuration of the control device shown in FIG. 10. The internal configuration of control device 3 shown in FIG. 10 is basically the same as the internal configuration of control device 3 shown in FIG. 4. However, it differs from FIG. 4 in the first embodiment in the following respects.

Short circuit switch controller 505 controls the on/off of not only short circuit switch 20 but also short circuit switches 23A and 23B in accordance with operation mode OM. That is, short circuit switch controller 505 opens short circuit switches 20, 23A, and 23B in the normal operation mode and closes short circuit switches 20, 23A, and 23B in the discharge operation mode and the protective operation mode.

Current-limiting resistance controller 506 controls bypass switches 15A and 15B instead of bypass switches 21A and 21B in accordance with operation mode OM. That is, current-limiting resistance controller 506 closes bypass switches 15A and 15B in the normal operation mode and opens bypass switches 15A and 15B in the discharge operation mode and the protective operation mode.

Figure 14:
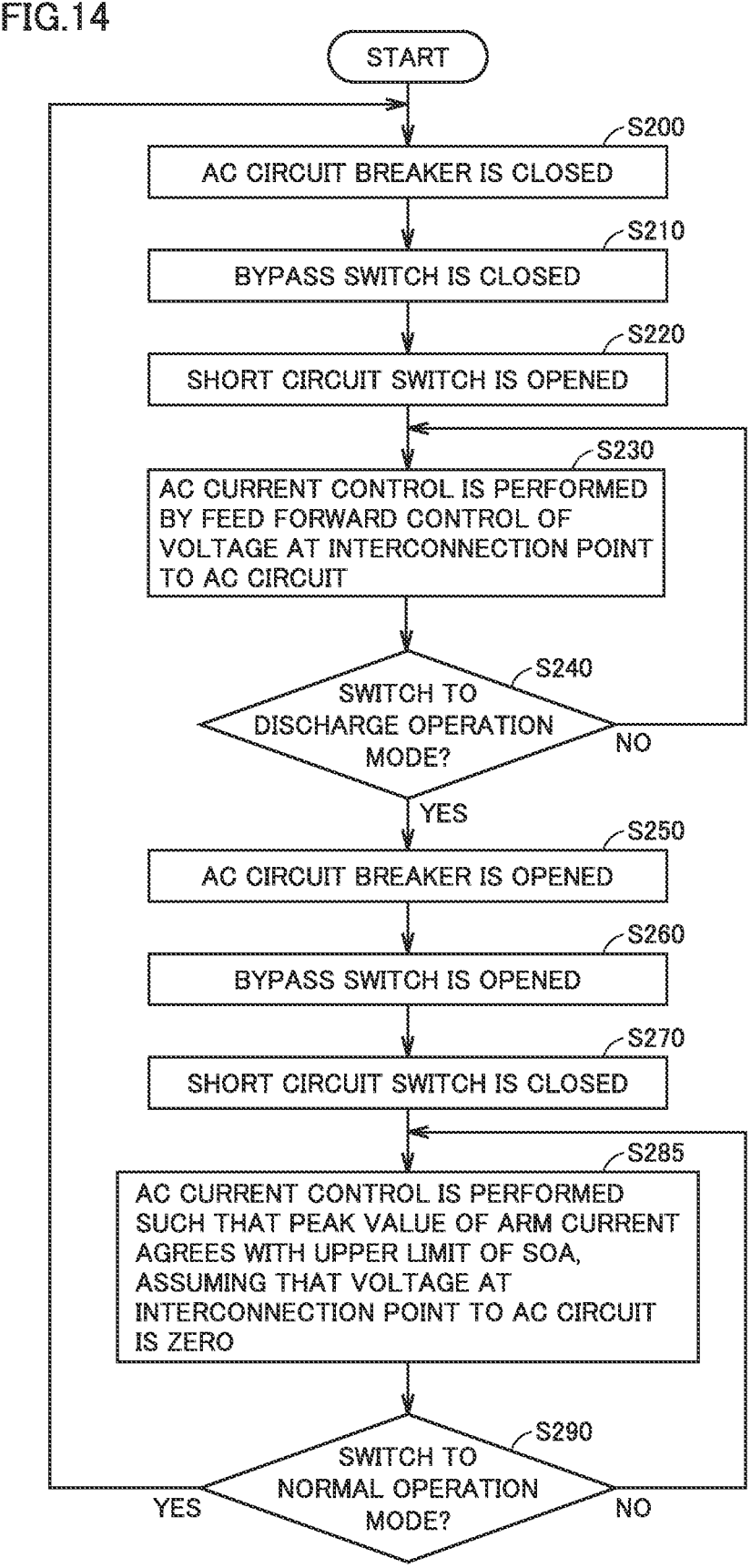
FIG. 14 is a flowchart illustrating the operation of a discharge controller and the AC current controller in the discharge operation mode in the power conversion device in the third embodiment.

The other parts in FIG. 11 are the same as those in FIG. 14 and the same or corresponding parts are denoted by the same reference signs and will not be further elaborated. The description with reference to FIG. 2, FIG. 3, FIG. 5 to FIG. 9 in the first embodiment is generally the same as in the second embodiment and will not be repeated.

Effect of Second Embodiment

In power conversion device 1 in the second embodiment, AC short circuit current and DC short circuit current can be fed through current-limiting resistor 18 provided in each arm 5, 6 in the discharge operation mode. Power conversion device 1 in the second embodiment therefore can achieve the same effect as power conversion device 1 in the first embodiment and, in addition, further accelerate discharge of capacitor 32 of each converter cell 7 in the discharge operation mode.

Third Embodiment

In a third embodiment, power converter 2 is controlled such that the effective value or amplitude value of AC current Iac is maximized in the range of safety operating area (SOA). This can accelerate discharge of capacitor 32 of each converter cell 7. As used herein SOA refers to a range of voltage and current in which a semiconductor element used as switching element 31 of converter cell 7 can safely perform switching.

The hardware configuration of power conversion device 1 and the functional configuration of control device 3 in the third embodiment are the same as in the first embodiment and will not be further elaborated. In the following description, the third embodiment is combined with the first embodiment but the third embodiment may be combined with the second embodiment.

[Characteristics of Discharge Control in Power Conversion Device in Third Embodiment]

Figure 12:
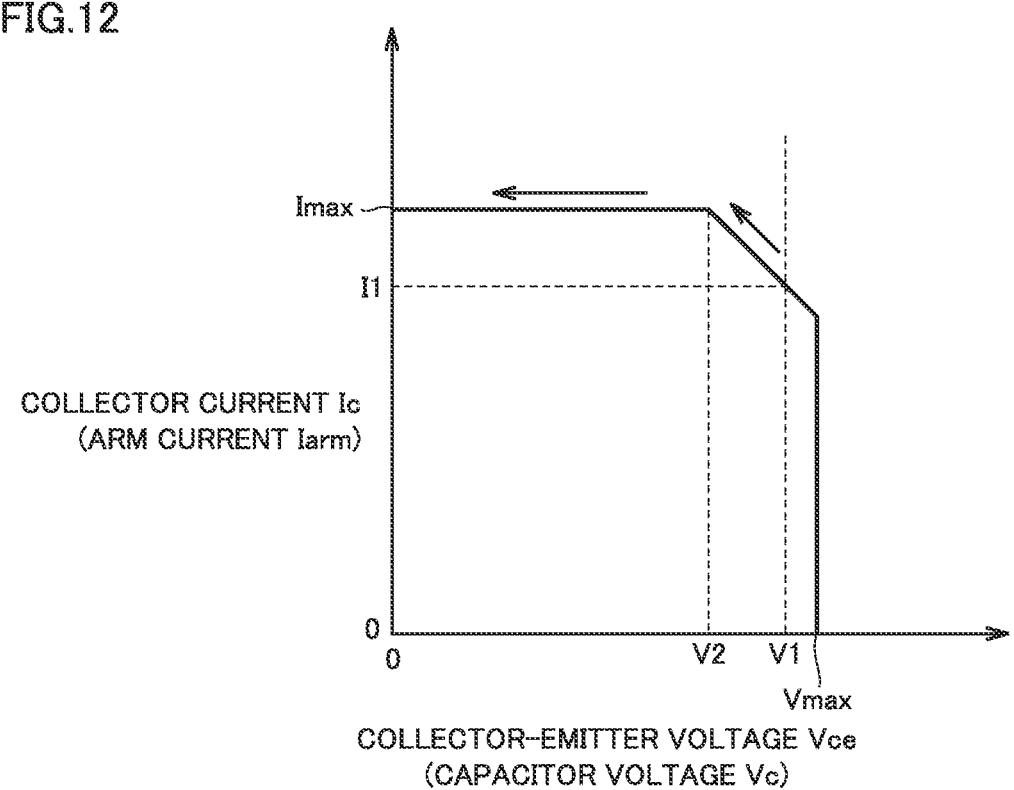
FIG. 12 is a diagram conceptually showing an example of SOA of an IGBT or a MOSFET.

FIG. 12 is a diagram conceptually showing an example of SOA of an IGBT or a MOSFET. The vertical axis in FIG. 12 shows collector current Ic, and the horizontal axis in FIG. 12 shows collector-emitter voltage Vce. Collector current Ic corresponds to arm current Iarm flowing through each arm, and collector-emitter voltage Vce corresponds to capacitor voltage Vc of each converter cell 7.

As shown in FIG. 12, from 0 to V2 of collector-emitter voltage Vce, the upper limit of collector current Ic is a fixed value Imax. From V2 to Vmax of collector-emitter voltage Vce, as collector-emitter voltage Vce increases, the permitted collector current Ic decreases. In this way, the upper limit of collector current Ic changes with collector-emitter voltage Vce.

The magnitude of the effective value or amplitude value of AC current Iac is therefore determined such that the peak value of arm current Iarm agrees with the upper limit of the SOA in accordance with capacitor voltage Vc. Since arm current Iarm is determined by the sum of AC output current Iac, DC output current Idc of power converter 2, and circulating current Iz flowing in the inside of power converter 2, arm current Iarm can be increased by increasing AC current Iac. As a result, discharge of capacitor 32 can be accelerated.

Specifically, in the case of FIG. 12, it is assumed that the value V1 of capacitor voltage Vc is excessive. Since the upper limit of arm current Iarm in this case is I1, AC current controller 603 determines the amplitude value or effective value of AC current Iac such that the peak value of arm current Iarm agrees with I1. Thereafter, as capacitor voltage Vc decreases due to discharge of capacitor 32, the upper limit of arm current Iarm increases. AC current controller 603 therefore increases the effective value or amplitude value of AC current Iac in accordance with the magnitude of capacitor voltage Vc. This enables safe and fast discharge of capacitor 32. When capacitor voltage Vc is equal to or lower than V2, the upper limit of SOA is constant at Imax. AC current controller 603 therefore determines the effective value or amplitude value of AC current Iac such that the peak value of arm current Iarm agrees with the upper limit Imax of SOA.

[Configuration Example of AC Current Controller]

Figure 13:
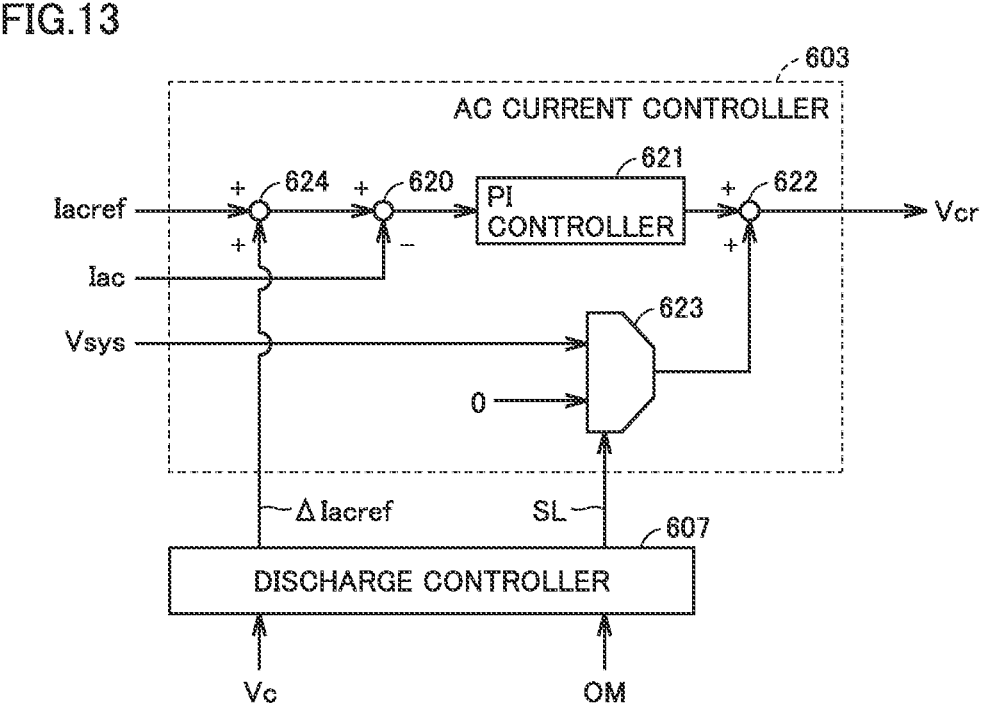
FIG. 13 is a block diagram showing a configuration example of the AC current controller in the power conversion device in a third embodiment.

FIG. 13 is a block diagram showing a configuration example of the AC current controller in the power conversion device in the third embodiment.

AC current controller 603 shown in FIG. 13 differs from AC current controller 603 in FIG. 6 in that it further includes an adder 624. Adder 624 adds an addition amount ΔIacref of AC current command value to AC current command value Iacref. Subtractor 620 computes a deviation between AC current command value Iacref with addition amount ΔIacref and a detection value of AC current Iac.

When the operation mode OM is the discharge operation mode, discharge controller 607 outputs addition amount ΔIacref to adder 624 in accordance with capacitor voltage Vc. The other parts in FIG. 13 are the same as those in FIG. 6 and the same or corresponding parts are denoted by the same reference signs and will not be further elaborated.

[Control Procedure of Power Converter 2 in Discharge Operation Mode]

FIG. 14 is a flowchart illustrating the operation of the discharge controller and the AC current controller in the discharge operation mode in the power conversion device in the third embodiment. The flowchart in FIG. 14 differs from the flowchart in FIG. 9 in that step S280 is changed to step S285. The other steps in FIG. 14 are the same as those in FIG. 9 and the same or corresponding steps are denoted by the same reference signs and will not be further elaborated.

At step S285 in FIG. 14, AC current controller 603 determines the effective value or amplitude value of AC current command value Iacref such that the peak value of arm current Iarm is equal to the upper limit of SOA in accordance with decrease of capacitor voltage Vc. Alternatively, AC current controller 603 may change AC control command value Vcr such that the peak value of arm current Iarm is equal to the upper limit of SOA in accordance with decrease of capacitor voltage Vc, without changing AC current command value Iacref.

Effect of Third Embodiment

As described above, in power conversion device 1 in the third embodiment, control device 3 controls power converter 2 such that the effective value or amplitude value of AC current Iac is maximized in the range of SOA in the discharge operation mode. This enables fastest discharge of capacitor 32 without breaking switching element 31 of each converter cell 7.

Fourth Embodiment

In power conversion device 1 in a fourth embodiment, the carrier frequency in pulse width control is increased in the discharge operation mode. This can increase switching loss of switching element 31 and thereby accelerate discharge of capacitor 32.

In the following, a detailed configuration of individual cell controller 202 in FIG. 7 and the pulse width control will be described first, and then the characteristics of the discharge operation mode in power conversion device 1 in the fourth embodiment will be described. The hardware configuration of power conversion device 1 and the functional configuration of control device 3 in the fourth embodiment are the same as in the first embodiment and will not be further elaborated. The fourth embodiment can be combined not only with the first embodiment but also with the second embodiment. Both of the third and fourth embodiments can be applied to the first embodiment or the second embodiment.

Figure 15:
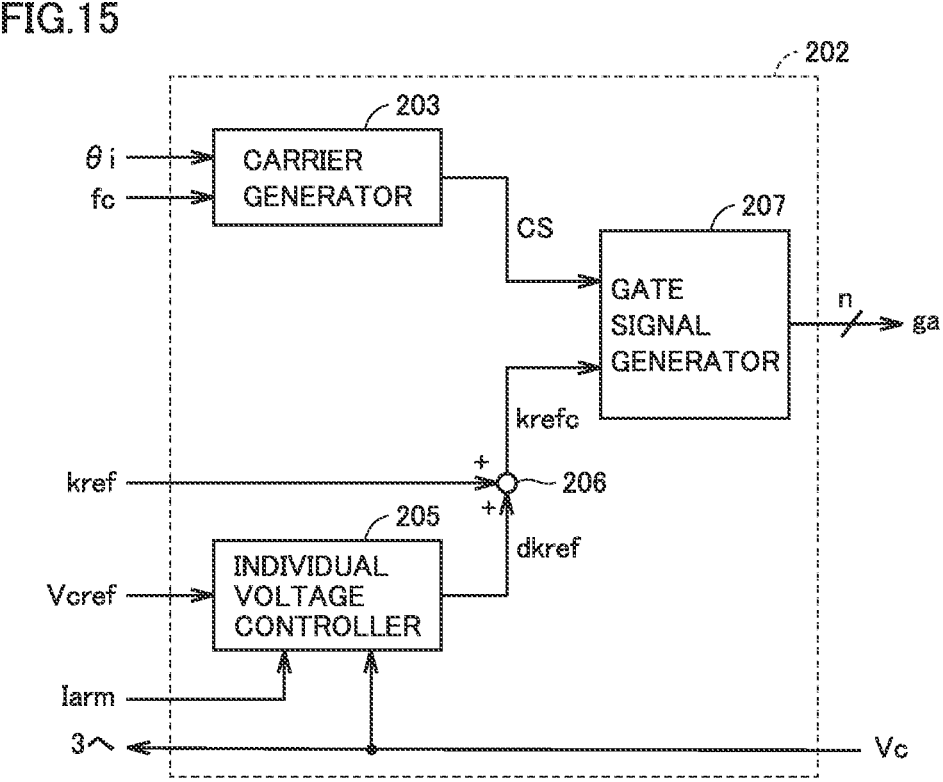
FIG. 15 is a block diagram showing a configuration example of individual cell controller 202 shown in FIG. 7.

FIG. 15 is a block diagram showing a configuration example of individual cell controller 202 shown in FIG. 7.

Referring to FIG. 15, individual cell controller 202 includes a carrier generator 203, an individual voltage controller 205, an adder 206, and a gate signal generator 207.

Carrier generator 203 generates a carrier signal CS having a predetermined frequency (that is, carrier frequency) for use in phase shift pulse width modulation (PWM) control. The phase shift PWM control allows the timings of PWM signals output to a plurality of (Ncell) converter cells 7 in the same arm (upper arm 5 or lower arm 6) to be shifted from each other. It is known that this can reduce harmonic components included in a synthesized voltage of output voltages of converter cells 7.

Carrier generator 203 generates carrier signal CS with phases shifted from each other among Ncell converter cells 7, based on a common reference phase θi received from basic controller 502 and carrier frequency fc.

Individual voltage controller 205 receives capacitor voltage command value Vcref, capacitor voltage Vc of the corresponding converter cell 7, and the detection value of arm current Iarm of the arm to which the corresponding converter cell 7 belongs to. Capacitor voltage command value Vcref may be set to the average value of capacitor voltage Vc of the entire power converter 2 or may be set to the average value of capacitor voltages of Ncell converter cells 7 included in the same arm.

Individual voltage controller 205 performs computation on a deviation of capacitor voltage Vc from capacitor voltage command value Vcref and calculates a control output dkref for individual voltage control. Individual voltage controller 205 also may be configured with a controller that executes PI control or PID control. Further, control output dkref for charging/discharging capacitor 32 in a direction that eliminates the deviation is calculated by multiplying the computation value by the controller by "+1" or "−1" depending on the polarity of arm current Iarm. Alternatively, control output dkref for charging/discharging capacitor 32 in a direction that eliminates the deviation may be calculated by multiplying the computation value by arm current Iarm.

Adder 206 outputs a cell voltage command value krefc by adding arm voltage command value kref from basic controller 502 to control output dkref of individual voltage controller 205.

Gate signal generator 207 generates gate signal ga by performing PWM modulation of cell voltage command value krefc by carrier signal CS from carrier generator 203.

Figure 16:
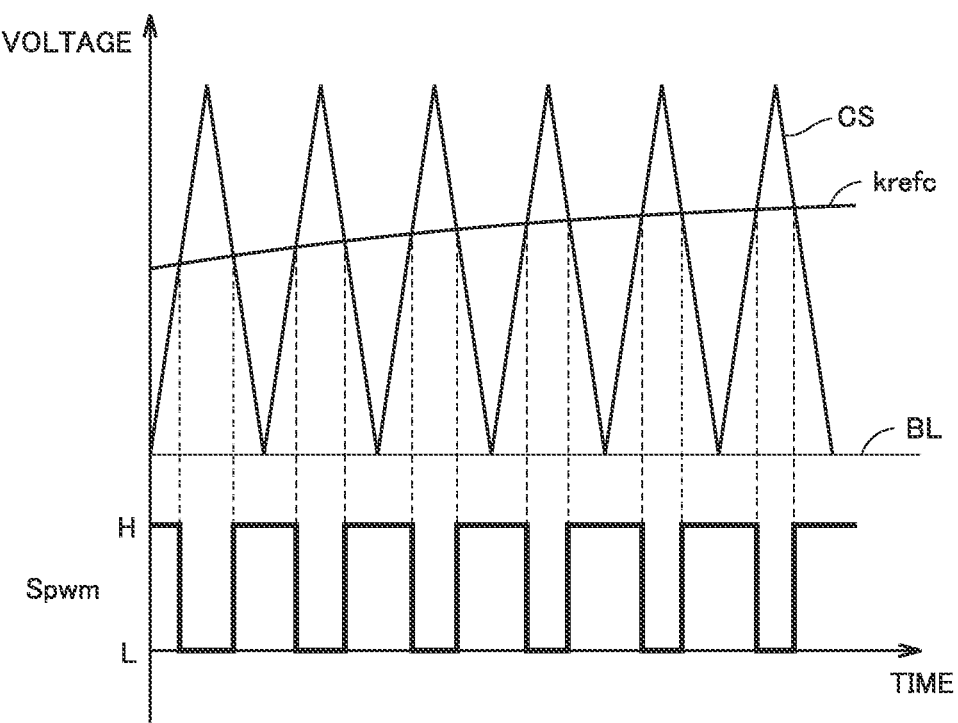
FIG. 16 is a conceptual waveform diagram illustrating PWM modulation control by a gate signal generator shown in FIG. 15.

FIG. 16 is a conceptual waveform diagram illustrating PWM modulation control by the gate signal generator shown in FIG. 15. The signal waveform shown in FIG. 16 is exaggerated for explanation and does not represent the actual signal waveform as it is.

Referring to FIG. 16, cell voltage command value krefc is compared in voltage with carrier signal CS typically formed of a triangular wave. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signal ga (n=2) is generated such that switching element 31$p$ is turned on while switching element 31$n$ is turned off in converter cell 7 in (A) in FIG. 2. Conversely, in the L level period of PWM modulation signal Spwm, gate signal ga (n=2) is generated such that switching element 31$n$ is turned on while switching element 31$p$ is turned off.

Gate signal ga is sent to the gate driver (not shown) of switching element 31$p$, 31$n$ of converter cell 7 whereby the on and off of switching element 31$p$, 31$n$ of converter cell 7 is controlled.

Cell voltage command value krefc corresponds to a sinusoidal wave voltage modified by control output dkref. In control device 3, therefore, a percent modulation command value in PWM modulation can be calculated by a known method from the amplitude (or effective value) of the sinusoidal wave voltage (arm voltage command value kref) and the amplitude of carrier signal CS.

[Control Procedure of Power Converter 2 in Discharge Operation Mode]

Figure 17:
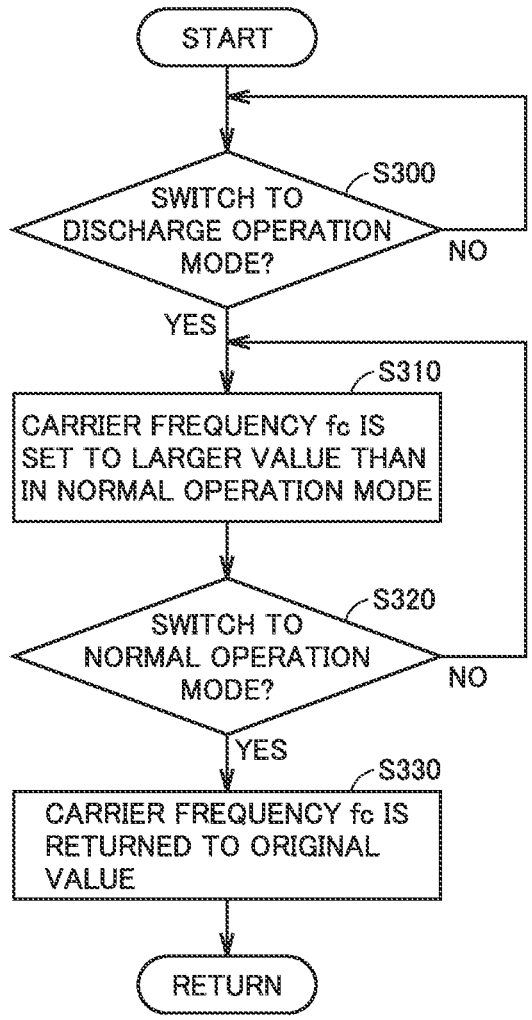
FIG. 17 is a flowchart illustrating the setting of a carrier frequency in the power converter in a fourth embodiment.

FIG. 17 is a flowchart illustrating the setting of a carrier frequency in the power converter in the fourth embodiment. In an initial state, it is assumed that control device 3 is in the normal operation mode.

If the normal operation mode is switched to the discharge operation mode (YES at step S300), control device 3 proceeds to step S310. At step S310, control device 3 sets the carrier frequency fc to a larger value than in the normal operation mode. Increasing carrier frequency fc to a frequency limit determined by the upper limit of operating temperature of switching element 31 can increase the loss of switching element 31, thereby accelerating discharge of capacitor 32.

If the discharge operation mode is kept (NO at step S310), the above step S310 is continued. On the other hand, if the discharge operation mode is switched to the normal operation mode (YES at step S310), at the next step S330, control device 3 returns carrier frequency fc to the original setting value in the normal operation mode.

Effect of Fourth Embodiment

As described above, in power conversion device 1 in the fourth embodiment, control device 3 sets carrier frequency fc in the phase shift PWM control to a larger value in the discharge operation mode than in the normal operation mode. This can increase switching loss of switching element 31 of converter cell 7 and thereby accelerate discharge of capacitor 32.

Fifth Embodiment

In power conversion device 1 in a fifth embodiment, active gate drive is used to increase the loss of switching element 31 in the discharge operation mode. This can accelerate discharge of capacitor 32. A specific description will be given below with reference to the drawings. The fifth embodiment can be combined with either the first embodiment or the second embodiment. Both of the third and fifth embodiments, both of the fourth and fifth embodiments, or all of the third, fourth, and fifth embodiments can be applied to the first embodiment or the second embodiment.

[Configuration Example of Active Gate Drive]

Figure 18:
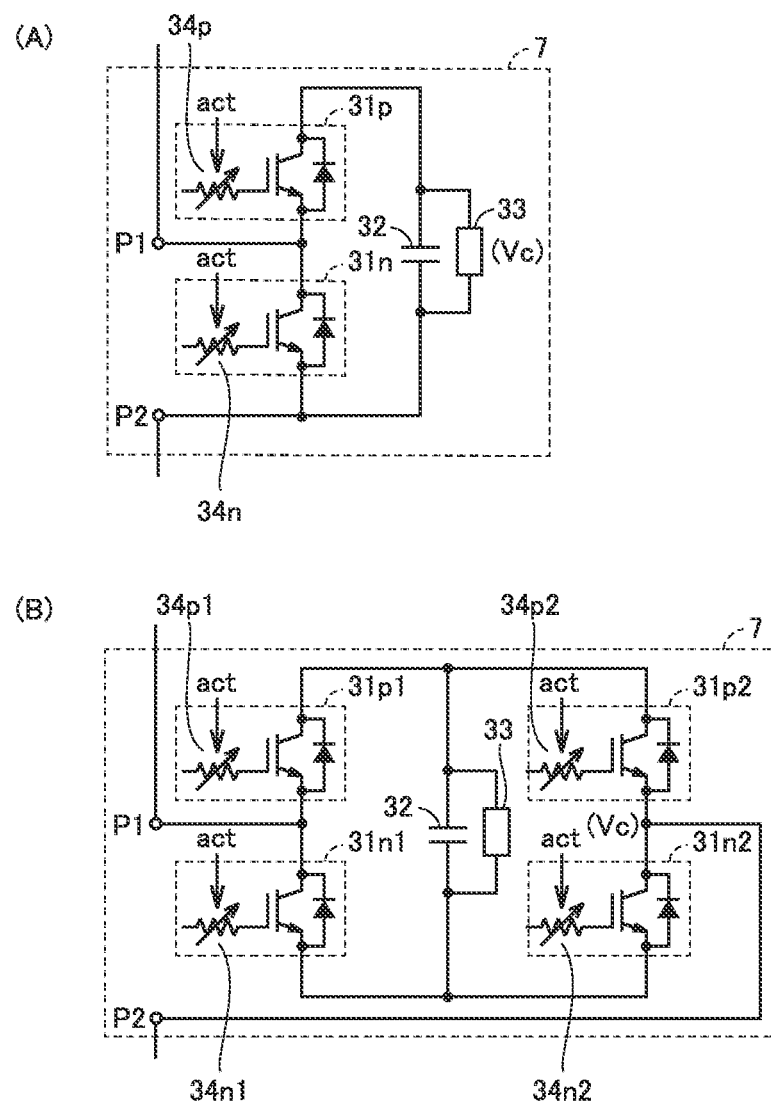
FIG. 18 is a circuit diagram showing a configuration example of a converter cell that constitutes the power converter in a power conversion device in a fifth embodiment.

FIG. 18 is a circuit diagram showing a configuration example of a converter cell that constitutes the power converter in the power conversion device in the fifth embodiment. In the fifth embodiment, converter cell 7 includes a gate driver capable of active gate drive of switching element 31.

Specifically, the circuit diagram (A) in FIG. 18 differs from the circuit diagram (A) in FIG. 2 in that it further includes gate resistors 34$p$ and 34$n$ with a variable resistance in accordance with a control signal act. Similarly, the circuit diagram (B) in FIG. 18 differs from the circuit diagram (B) in FIG. 2 in that it further includes gate resistors 34$p$1, 34$p$2, 34$n$1, and 34$n$2 with a variable resistance in accordance with a control signal act. The other parts in FIG. 18 are the same as those in FIG. 2 and the same or corresponding parts are denoted by the same reference signs and will not be further elaborated.

In FIG. 18, gate resistors 34$p$ and 34$n$ and gate resistors 34$p$1, 34$p$2, 34$n$1, and 34$n$2 are denoted as gate resistor 34 when they are collectively referred to or any one of them is referred to. In FIG. 18, a variable resistor is provided as gate resistor 34, but gate resistor 34 may be configured such that a resistance is changed by switching the connection of a plurality of resistors.

Figure 19:
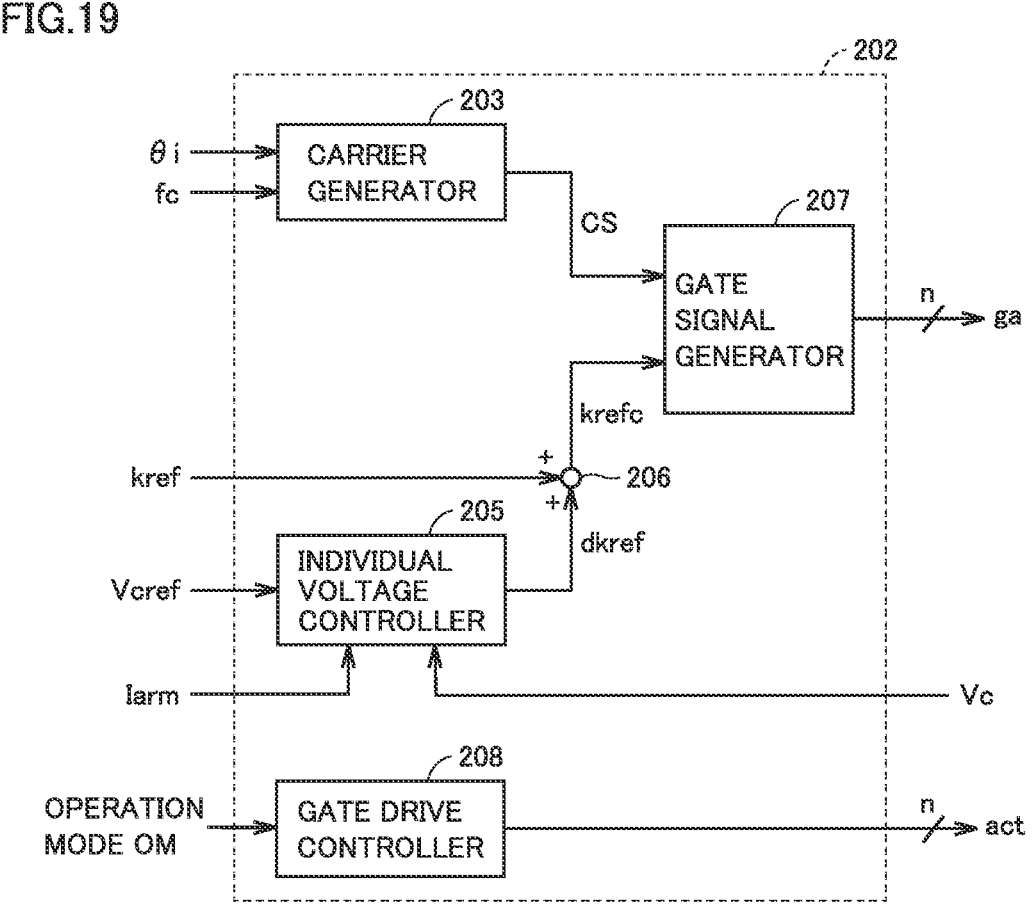
FIG. 19 is a block diagram showing a configuration example of the individual cell controller in the power conversion device in the fifth embodiment.

FIG. 19 is a block diagram showing a configuration example of the individual cell controller in the power conversion device in the fifth embodiment. Individual cell controller 202 in FIG. 19 differs from individual cell controller 202 in FIG. 12 in that it further includes a gate drive controller 208. The other parts in FIG. 19 are the same as those in FIG. 12 and the same or corresponding parts are denoted by the same reference signs and will not be further elaborated.

Referring to FIG. 18 and FIG. 19, gate drive controller 208 of individual cell controller 202 activates control signal act when the operation mode of control device 3 switches from the normal operation mode to the discharge operation mode. Gate drive controller 208 thus increases the gate resistance of the corresponding converter cell 7. As a result, the switching time of switching element 31 of converter cell 7 increases and thus the switching loss increases, thereby accelerating discharge of capacitor 32.

The method of active gate drive is not limited to the method that changes the gate resistance as long as the switching loss of switching element 31 is changed. For example, the switching time may be increased by a method other than increasing the gate resistance.

[Control Procedure of Power Converter 2 in Discharge Operation Mode]

Figure 20:
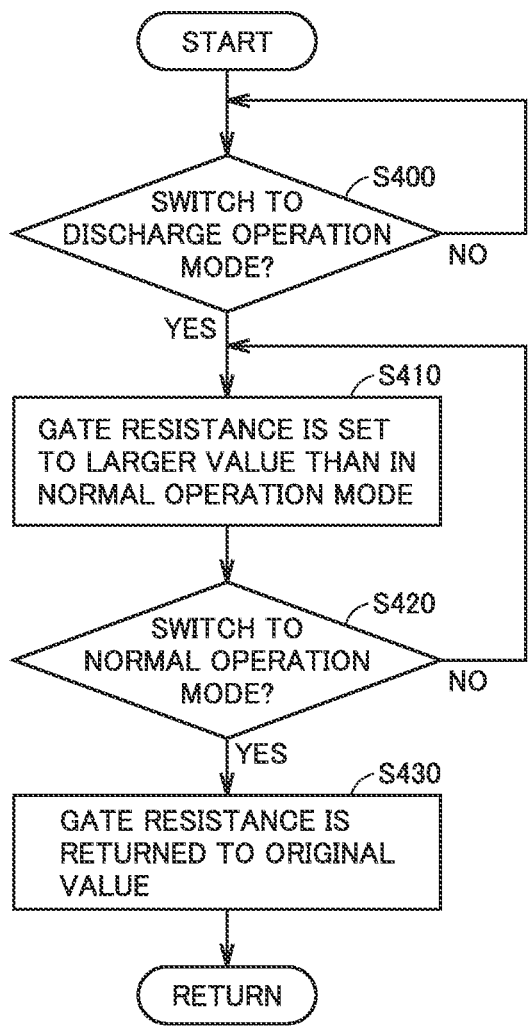
FIG. 20 is a flowchart illustrating the setting of a gate resistance in the power converter in the fifth embodiment.

FIG. 20 is a flowchart illustrating the setting of a gate resistance in the power converter in the fifth embodiment. In an initial state, it is assumed that control device 3 is in the normal operation mode.

If the normal operation mode is switched to the discharge operation mode (YES at step S400), control device 3 proceeds to step S410. At step S410, control device 3 sets the resistance of gate resistor 34 provided corresponding to switching element 31 of each converter cell 7 to a larger value than in the normal operation mode.

If the discharge operation mode is kept (NO at step S410), the above step S410 is continued. On the other hand, if the discharge operation mode is switched to the normal operation mode (YES at step S410), at the next step S430, control device 3 returns the gate resistance to the original setting value in the normal operation mode.

Effect of Fifth Embodiment

As described above, in power conversion device 1 in the fifth embodiment, control device 3 controls each converter cell 7 such that the loss of switching element 31 becomes larger than in the normal operation mode by using the active gate drive. This can accelerate discharge of capacitor 32.

Embodiments disclosed here should be understood as being illustrative rather than being limitative in all respects. The scope of the subject application is shown not in the foregoing description but in the claims, and it is intended that all modifications that come within the meaning and range of equivalence to the claims are embraced here.

REFERENCE SIGNS LIST 1 power conversion device, 2 power converter, 3 control device, 4 leg circuit, 5 upper arm, 6 lower arm, 7 converter cell, 8A, 8B reactor, 9A, 9B arm current detector, 10 AC voltage detector, 11A, 11B DC voltage detector, 12 AC circuit, 13 transformer, 14 DC circuit, 15, 21 bypass switch, 16 AC current detector, 17 DC current detector, 18, 22 current-limiting resistor, 19 AC circuit breaker, 20, 23A, 23B short circuit switch, 31 switching element, 32 power storage element (capacitor), 33 voltage detector, 34 gate resistor, 70 input converter, 71 sample and hold circuit, 72 multiplexer, 73 A/D converter, 74 CPU, 75 RAM, 76 ROM, 77 input/output interface, 78 auxiliary storage device, 79 bus, 202 individual cell controller, 203 carrier generator, 205 individual voltage controller, 207 gate signal generator, 208 gate drive controller, 502 basic controller, 503 arm controller, 504 AC circuit breaker controller, 505 short circuit switch controller, 506 current-limiting resistor controller, 601 arm voltage command generator, 602 capacitor voltage command generator, 603 AC current controller, 604 DC current controller, 605 circulating current controller, 606 command distributor, 607 discharge controller, Iacref AC current command value, Iacu, Iacv, Iacw AC current, Iarm arm current, Idc DC output current, Idcref DC current command value, Iz circulating current, Izref circulating current command value, Nn low potential-side DC terminal, Np high potential-side DC terminal, Nu, Nv, Nw AC input terminal, P1, P2 input/output terminal, Vsysu, Vsysv, Vsysw AC voltage, Vc capacitor voltage, Vcr AC control command value, Vdc, Vdcn, Vdcp DC voltage, Vdcr DC control command value, Vdcref DC voltage command value, Vsn neutral point voltage, Vzr circulating control command value, fc carrier frequency, ga gate signal, kref, krefn, krefp arm voltage command value, krefc cell voltage command value.

The invention claimed is:

1. A power conversion device comprising:
a power converter including a plurality of arms each having a plurality of converter cells cascaded to each other, wherein
each of the arms is electrically connected to a corresponding phase of an AC circuit, and
each of the converter cells includes:
   a pair of input/output terminals;
   a plurality of switching elements; and
   a power storage element electrically connected to the input/output terminals through the switching elements;
the power conversion device further comprising:
an AC circuit breaker connected between the AC circuit and the power converter;
a current-limiting resistor connected to a path of AC output current of the power converter;
a bypass switch connected in parallel with the current-limiting resistor;
a short circuit switch to short-circuit an AC line between the AC circuit breaker and the current-limiting resistor; and
a control device, wherein
in a first operation mode, the control device performs power conversion operation by allowing switching of each switching element of each of the converter cells in a state in which the AC circuit breaker and the bypass switch are closed and the short circuit switch is opened, and
in a second operation mode, the control device performs power conversion operation by allowing switching of each switching element of each of the converter cells in a state in which the AC circuit breaker and the bypass switch are opened and the short circuit switch is closed.

2. The power conversion device according to claim 1, wherein
in the first operation mode, the control device controls an AC output of the power converter by feedback control for nullifying a deviation between an AC current command value and a detection value of the AC output current and feed forward control of an AC voltage at an interconnection point between the AC circuit and the power converter, and in the second operation mode, the control device controls an AC output of the power converter by the feedback control and feed forward control in which an AC voltage at the interconnection point between the AC circuit and the power converter is assumed as zero.

3. The power conversion device according to claim 1, wherein the current-limiting resistor is connected to an AC line between the AC circuit and the power converter.

4. The power conversion device according to claim 1, wherein the current-limiting resistor is connected in series with the converter cells in each of the arms.

5. The power conversion device according to claim 4, wherein
the power conversion device performs power conversion between the AC circuit and a DC circuit,
the power conversion device further comprises an additional short circuit switch connected between a ground electrode and an interconnection point between the power converter and the DC circuit, and
the control device opens the additional short circuit switch in the first operation mode and closes the additional short circuit switch in the second operation mode.

6. The power conversion device according to claim 1, wherein the control device increases an effective value or amplitude value of the AC output current in the second operation mode, compared with in the first operation mode.

7. The power conversion device according to claim 6, wherein, in the second operation mode, the control device changes an effective value or amplitude value of the AC output current such that a peak value of arm current agrees with an upper limit of current determined by a safety operating area of each switching element of the converter cells.

8. The power conversion device according to claim 1, wherein
the control device controls an output voltage of each of the converter cells by phase shift pulse width modulation, and
the control device increases a carrier frequency in the phase shift pulse width modulation in the second operation mode, compared with in the first operation mode.

9. The power conversion device according to claim 1, wherein
switching loss of each switching element in each of the converter cells is changed by control from the control device, and
the control device increases switching loss of each switching element in each of the converter cells in the second operation mode, compared with in the first operation mode.

10. The power conversion device according to claim 9, wherein
a gate resistance of each switching element in each of the converter cells is changed by control from the control device, and
the control device increases the switching loss by increasing the gate resistance in the second operation mode, compared with in the first operation mode.

11. The power conversion device according to claim 1, wherein the control device switches an operation mode from the first operation mode to the second operation mode when a voltage of at least one of the power storage elements in the converter cells exceeds a threshold.

12. The power conversion device according to claim 1, wherein when receiving a command to stop operation of the power converter, the control device switches an operation mode from the first operation mode to the second operation mode.

13. The power conversion device according to claim 1, wherein
   the power conversion device performs power conversion between the AC circuit and a DC circuit,
   the control device switches an operation mode from the first operation mode to a third operation mode when detecting that a DC output current output from the power converter to the DC circuit exceeds a threshold, and
   in the third operation mode, the control device turns off each switching element in each of the converter cells, opens the AC circuit breaker and the bypass switch, and closes the short circuit switch.

\* \* \* \* \*